(12) United States Patent
Chung et al.

(10) Patent No.: US 9,684,199 B2
(45) Date of Patent: Jun. 20, 2017

(54) LIQUID CRYSTAL DISPLAY SUBSTRATE AND DEVICE

(71) Applicant: Infovision Optoelectronics (Kunshan) Co., Ltd., KunShan (CN)

(72) Inventors: Te-Chen Chung, KunShan (CN); Tean-Sen Jen, KunShan (CN); Chia-Te Liao, KunShan (CN); Yong-qian Li, KunShan (CN); Hong-qing Cui, KunShan (CN); Jin-yu Li, KunShan (CN); Dong-zhao Li, KunShan (CN)

(73) Assignee: INFOVISION OPTOELECTRONICS (KUNSHAN) CO., LTD., Kunshan (CN)

( * ) Notice: Subject to any disclaimer, the term of this patent is extended or adjusted under 35 U.S.C. 154(b) by 265 days.

(21) Appl. No.: 14/033,513

(22) Filed: Sep. 22, 2013

(65) Prior Publication Data
US 2014/0340621 A1 Nov. 20, 2014

(30) Foreign Application Priority Data
May 20, 2013 (CN) .......................... 2013 1 0188430

(51) Int. Cl.
*G02F 1/1333* (2006.01)
*G02F 1/1335* (2006.01)
(Continued)

(52) U.S. Cl.
CPC .. *G02F 1/133514* (2013.01); *G02F 1/134363* (2013.01); *G02F 1/1337* (2013.01);
(Continued)

(58) Field of Classification Search
CPC ... G02F 2001/134381; G02F 1/134363; G02F 1/133514; G02F 2001/133519; G02F 1/1337
See application file for complete search history.

(56) References Cited

U.S. PATENT DOCUMENTS 5,936,693 A * 8/1999 Yoshida et al. ............... 349/139
8,004,644 B2 * 8/2011 Kurasawa ..................... 349/141
(Continued)

FOREIGN PATENT DOCUMENTS

WO WO 2012105067 A1 * 8/2012

*Primary Examiner* — Paisley L Arendt
(74) *Attorney, Agent, or Firm* — Ding Yu Tan

(57) ABSTRACT

A liquid crystal display device includes a first substrate, a second substrate, and a liquid crystal layer. The first substrate includes a first transparent substrate including a first surface and a second surface, a color filter layer formed on the first surface of the first transparent substrate, a first alignment film formed on the color filter layer, and a first electrode interlayered in the color filter layer. The second substrate includes a second transparent substrate comprising a third surface and a fourth surface, a second electrode and a third electrode formed on the third surface of the second transparent substrate sequentially, and a second alignment film is formed on the third electrode. The second electrode and the third electrode are arranged at different insulation layers respectively and electrically insulated with each other. The LCD device of the present invention has an improved transmittance and a fast response time.

12 Claims, 22 Drawing Sheets

(51) Int. Cl.
  *G02F 1/1343* (2006.01)
  *G02F 1/1337* (2006.01)
(52) U.S. Cl.
  CPC ............ *G02F 2001/134381* (2013.01); *G02F 2201/121* (2013.01)

(56) References Cited

U.S. PATENT DOCUMENTS

2007/0159586 A1* 7/2007 Kim .................. G02F 1/133707
                                                          349/143
2009/0109202 A1* 4/2009 Kitagawa ...................... 345/206
2013/0027644 A1* 1/2013 Liou et al. .................... 349/106
2013/0107182 A1* 5/2013 Hagiwara et al. ............ 349/110
2013/0258219 A1* 10/2013 Takagi ............... G02B 27/2214
                                                           349/15
2013/0300989 A1* 11/2013 Hibayashi et al. ........... 349/108

* cited by examiner

LIQUID CRYSTAL DISPLAY SUBSTRATE AND DEVICE

CROSS-REFERENCE TO RELATED APPLICATIONS

This application claims priority from Chinese Patent Application No. 201310188430.6 filed on May 20, 2013. The contents of the above-mentioned patent application is hereby incorporated by reference herein in its entirety and made a part of this specification.

FIELD OF THE PRESENT INVENTION

The present invention relates to the field of liquid crystal display (LCD), and more particularly to an LCD device.

BACKGROUND OF THE PRESENT INVENTION

Thin Film Transistor-Liquid Crystal Display (TFT-LCD) has been widely used of various applications in flat panel display field due to characteristics of low radiation, thin thickness and low power consumption, etc. Initially, most of desktop TFT-LCD devices are based on twisted nematic (TN) mode. However, a first electrode and a second electrode of a traditional TN mode LCD device are separately formed on a first substrate and a second substrate, and liquid crystal (LC) molecules sandwiched between the first substrate and the second substrate rotate in a plane orthogonal to both the first substrate and the second substrate. Due to the optical anisotropy of the LC molecules, before entering human eyes, light beams passing through the LC molecules at different angles already have different optical path lengths, and therefore, high quality information display can only be obtained within a limited range of viewing angles.

In order to improve the viewing angle characteristics of LCDs, various methods and modes of operation have been proposed, such as in-plane switch (IPS) mode. In the conventional technology of IPS mode LCD, in order to eliminate the external static electricity, which is to prevent electrostatic moire (Mura) phenomenon, an ITO (Indium tin Oxide) layer is usually sputtered on the outer surface of the color filter substrate of the IPS mode LCD. And the ITO layer is sputtered after the color filter substrate and an array substrate respectively are being thinned and assembled to a liquid crystal panel, which virtually extends or prolongs the entire process time, making the cost greatly increased.

In order to solve the above problem, the ITO layer can be formed on the side of the color filter substrate close to the ITO layer before completing the assembly of the LCD panel. The ITO layer is electrical conducted with a common electrode of the array substrate, and then the assembly of the LCD panel is completed. In doing so, the process is simplified, thus the processing time is reduced and production costs are lower. However, in this method, since the ITO layer in the color filter substrate is electrical conducted with the common electrode of the array substrate, a relatively strong vertical electric field exists between the color filter substrate and the array substrate, which restrains the liquid crystal molecules to rotate in a plane within a certain extent. Thus, the transmittance of the LCD device is decreased, and the response time of the LCD device is slow.

SUMMARY OF INVENTION

Embodiments of the present invention relate to a liquid crystal display device having an improved transmittance and a faster response time.

A liquid crystal display device includes a first substrate, a second substrate opposite to the first substrate, and a liquid crystal layer sandwiched between the first substrate and the second substrate. The first substrate includes a first transparent substrate including a first surface disposed adjacent to the second substrate and a second surface disposed far away from the second substrate, a color filter layer formed on the first surface of the first transparent substrate, a first alignment film formed on the color filter layer, and a first electrode interlayered in the color filter layer. The second substrate includes a second transparent substrate comprising a third surface disposed adjacent to the first substrate and a fourth surface disposed far away from the first substrate, a second electrode and a third electrode formed on the third surface of the second transparent substrate sequentially, wherein the second electrode and the third electrode are arranged at different insulation layers respectively and electrically insulated with each other, and a second alignment film formed on the third electrode.

In an embodiment of the present invention, the color filter layer comprises a black matrix layer and a photoresist layer, the black matrix layer is formed on the first surface of the first transparent substrate, the first electrode formed on the black matrix layer, the photoresist layer is formed on the first electrode.

In an embodiment of the present invention, the first electrode is directly formed on the black matrix layer and a portion of the first surface of the first transparent substrate not covered by the black matrix layer, and the photoresist layer is directly formed on a surface of the first electrode disposed far away from the first transparent substrate.

In an embodiment of the present invention, the first alignment film is directly formed on a surface of the photoresist layer disposed far away from the first transparent substrate.

In an embodiment of the present invention, the color filter layer further comprises an over coat layer, the over coat layer is directly formed on a surface of the photoresist layer far away from the first transparent substrate, the first alignment film is disposed between the over coat layer and the liquid crystal layer.

In an embodiment of the present invention, the color filter layer further comprises an over coat layer, the over coat layer is directly formed on the black matrix layer and a portion of the first surface of the first transparent substrate, the portion of the first surface is not covered by the black matrix, the first electrode is directly formed on a surface of the over coat layer disposed far away from the first transparent substrate, and the photoresist layer is formed on a surface of a first electrode disposed far away from the first transparent substrate.

In an embodiment of the present invention, the color filter layer comprises a black matrix layer and a photoresist layer, the black matrix layer is directly formed on the first surface of the first transparent substrate, the photoresist layer is formed on the black matrix layer and a portion of the first surface of the first transparent substrate not covered by the black matrix layer, the first electrode is directly formed on a surface of the photoresist layer disposed far away from the first transparent substrate.

In an embodiment of the present invention, the color filter layer further comprises an over coat layer, the over coat layer is directly formed on a surface of the first electrode disposed far away from the first transparent substrate, the first alignment film is directly formed on a surface of the over coat layer disposed far away from the first transparent substrate.

In an embodiment of the present invention, the first alignment film has a first friction direction, the second alignment film has a second friction direction, and the first friction direction is opposite to the second friction direction.

In an embodiment of the present invention, liquid crystal molecules in the liquid crystal layer is negative liquid crystal molecules, an angle is defined between an arrangement direction of the third electrode and the second friction direction, and the angle is in a range from 60 degrees to 85 degrees.

In an embodiment of the present invention, liquid crystal molecules in the liquid crystal layer is positive liquid crystal molecules, an angle is defined between an arrangement direction of the third electrode and the second friction direction, and the angle is in a range from 5 degrees to 30 degrees.

In an embodiment of the present invention, the second electrode is a pixel electrode, the third electrode is a common electrode, and the first electrode is conducted with the third electrode.

In an embodiment of the present invention, the liquid crystal further includes an adhesive sealant disposed between the first substrate and the second substrate to seal the first substrate to the second substrate and surrounding the liquid crystal layer. The adhesive sealant includes a conductor, one end of the conductor is conducted with the first electrode and the other end of the conductor is conducted with the third electrode.

In an embodiment of the present invention, the second electrode is a pixel electrode, the third electrode is a common electrode, and the first electrode is connected to ground.

In an embodiment of the present invention, the first electrode is a floating electrode.

In an embodiment of the present invention, the first electrode is an electrode layer.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF EMBODIMENTS

In order to make the purpose, the features and the advantages of the embodiments of the present invention become more readily apparent. The present invention will now be described more specifically with reference to the following embodiments.

Figure 1:
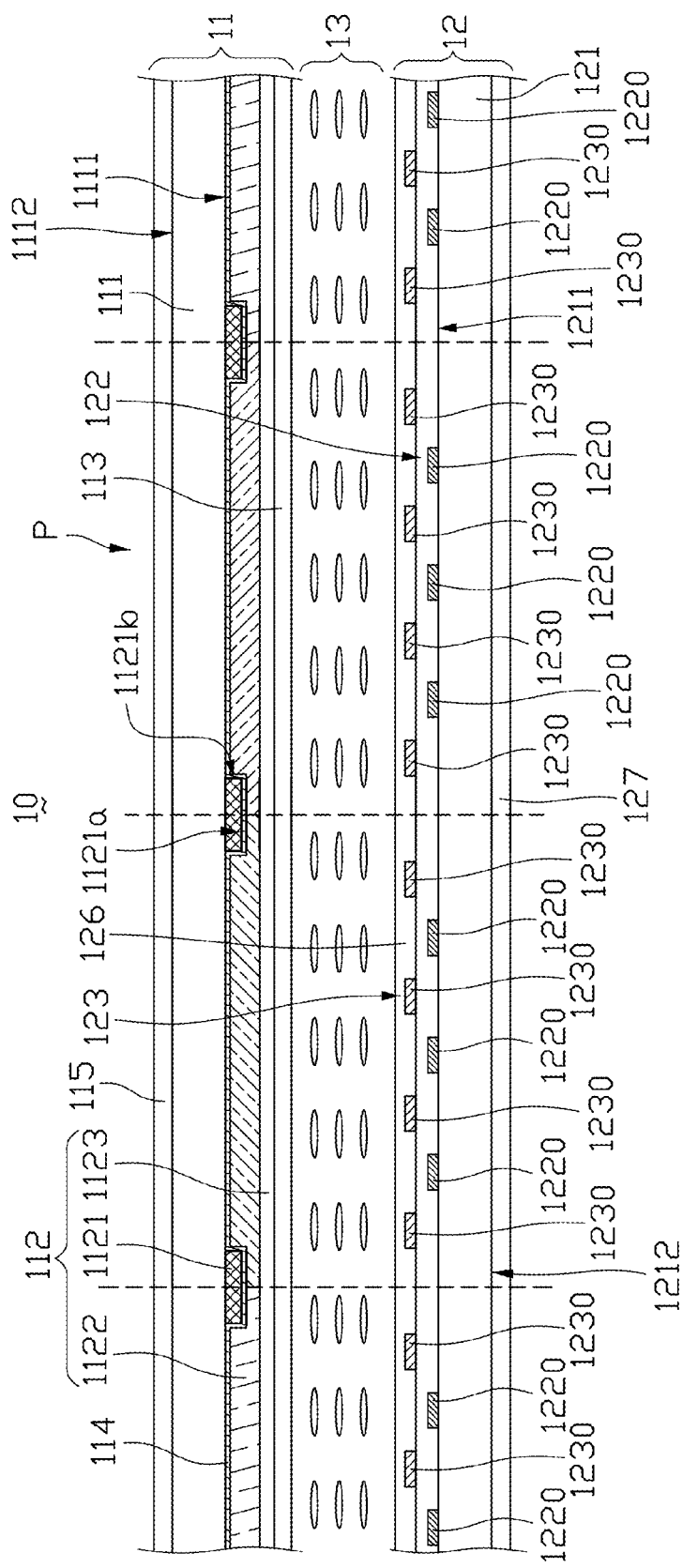
FIG. 1 is a cross-sectional view of an LCD device according to a first embodiment of the present invention.
Figure 2:
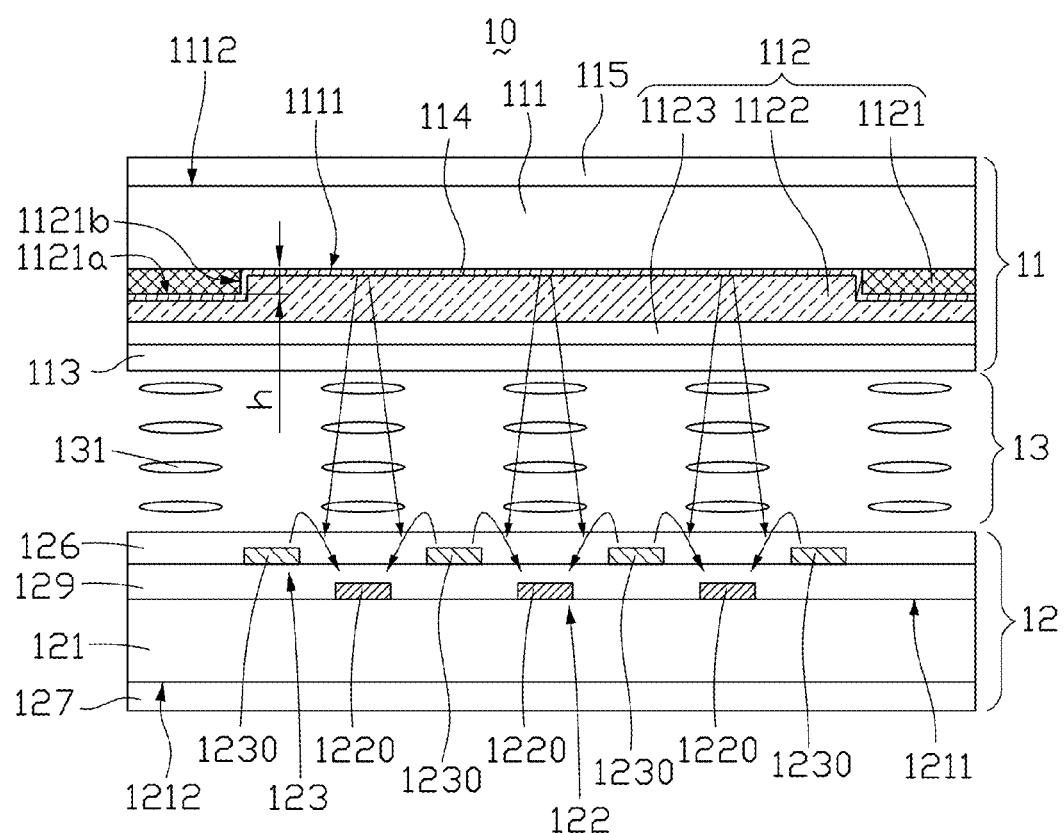
FIG. 2 is a cross-sectional view of one pixel area P in FIG. 1.

FIG. 1 is a cross-sectional view of an LCD device according to a first embodiment of the present invention. FIG. 2 is a cross-sectional view of one pixel area P in FIG. 1 (area between each two adjacent dotted lines in FIG. 1 corresponds to one pixel area P). Referring to FIGS. 1 and 2, an LCD device 10 according to the first embodiment of the present invention includes a first substrate 11, a second substrate 12 disposed opposite to the first substrate 11, and an LC layer 13 sandwiched between the first substrate 11 and the second substrate 12.

Specifically, the first substrate 11 includes a first transparent substrate 111. The first transparent substrate 111 includes a first surface 1111 disposed adjacent to the second substrate 12, and a second surface 1112 disposed far away from the second substrate 12.

Each portion of the first substrate 11 corresponding to one pixel area P includes a color filter layer 112, a first alignment film 113, and a first electrode 114. The color filter layer 112 and the first alignment film 113 are formed on the first surface 1111 of the first transparent substrate 111 sequentially. That is, the color filter layer 112 is formed on the first surface 1111 of the first transparent substrate 111, and the first alignment film 113 is then formed on the color filter layer 112. The first electrode 114 is interlayered in the color filter layer 112. That is, the first electrode 114 is a thin electrode layer and placed between various component layers of the color filter layer 112. Preferably, the first electrode is a transparent electrode, and maybe formed by transparent conductor materials, such as indium tin oxide (ITO), for example.

In the first embodiment, the color filter layer 112 includes a black matrix layer 1121, a photoresist layer 1122, and an over coat layer 1123. The black matrix layer 1121, the first electrode 114 and the photoresist layer 1122 are formed on the first surface 1111 of the first transparent substrate 111 sequentially. Preferably, the first electrode 114 is directly formed on the black matrix layer 1121, and the photoresist layer 1122 is directly formed on a surface of the first electrode 114 disposed far away from the first transparent substrate 111. The over coat layer 1123 is directly formed on a surface of the photoresist layer 1122 disposed far away from the first transparent substrate 111. In other words, the over coat layer 1123 is sandwiched between the photoresist layer 1122 and the first alignment film 113, and the first alignment film 113 is sandwiched between the over coat layer 1123 and the LC layer 13.

Specifically, in the first embodiment, the black matrix layer 1121 is directly formed on the first surface 1111 of the first transparent substrate 111. The first electrode 114 covers the black matrix layer 1121. That also means whole layer of the first electrode 114 is formed on a bottom surface 1121*a* of the black matrix layer 1121, a side surface 1121*b* of the black matrix layer 1121, and a portion of the first surface 1111 of the first transparent substrate 111 exposed from the black matrix layer 1121. Preferably, the first electrode 114 is uniformly sputtered on the bottom surface 1121*a* and the side surface 1121*b* of the black matrix layer 1121 and the portion of the first surface 1111 of the first transparent substrate 111 exposed from the black matrix layer 1121.

The whole photoresist layer 1122 may be, but is not limited to an RGB light filter layer. The photoresist layer 1122 may include a plurality of red filter patterns, a plurality of green filter patterns, and a plurality of blue filter patterns, and each of the filter patterns corresponds to a pixel area P. Of course, the structure and the pattern of the photoresist layer 1122 may be selected according to actual needs, and the present invention is not limited thereto.

Furthermore, the LCD device 10 still further includes a first polarizer 115 in the first substrate 11, wherein, the first polarizer 115 is formed on the second surface 1112 of the first transparent substrate 111.

In the first embodiment, the second substrate 12 includes a second transparent substrate 121. The second transparent substrate 121 includes a third surface 1211 disposed adjacent to the first substrate 11 and a fourth surface 1212 disposed far away from the first substrate 11.

Each portion of the second substrate 12 corresponding to one pixel area further includes a second electrode 122 and a third electrode 123. The second electrode 122 and the third electrode 123 are formed on the third surface 1211 of the second transparent substrate 121 sequentially. The second electrode 122 and the third electrode 123 are arranged at different insulation layers respectively. An insulation layer 129 is disposed therebetween to electrically insulate the second electrode 122 and the third electrode 123. One of the second electrode 122 and the third electrode 123 is a pixel electrode, and the other is a common electrode. Preferably, the second electrode 122 and the third electrode 123 are transparent electrodes, and may be made of transparent conductor materials, such as ITO, for example.

In an exemplary embodiment of the present invention, the second electrode 122 may be a pixel electrode, and the third electrode 123 may be a common electrode. Wherein, the second electrode 122 includes a plurality of second electrode portions 1220. The second electrode portions 1220 are strip-shaped, substantially parallel to each other and electrically coupled with each other. The third electrode 123 includes a plurality of third electrode portions 1230. The third electrode portions 1230 are strip-shaped, substantially parallel to each other, electrically coupled with each other and electrically coupled to the common electrode bus (not shown).

Preferably, in each pixel area P, each third electrode portion 1230 is disposed between two corresponding adjacent second electrode portions 1220, and the third electrode portion 1230 is substantially parallel to the second electrode portion 1220. For example, each third electrode portion 1230 is disposed in the middle of the two corresponding adjacent second electrode portions 1220. In alternative embodiments of the present invention, other design of the structure of the second electrode and the third electrode can be applied, please referring to the following description (FIGS. 7-9 and FIGS. 14-15, for example), and the present invention is not limited thereto.

Furthermore, the LCD device 10 may still further includes a second alignment film 126 and a second polarizer 127 in the second substrate 12. Wherein, the second alignment film 126 covers the third electrode 123, and the second polarizer 127 is formed on the fourth surface 1212 of the second transparent substrate 121.

In the first embodiment, a plurality of LC molecules 131 in the LC layer 13 may be negative LC molecules or positive LC molecules.

Figure 3:
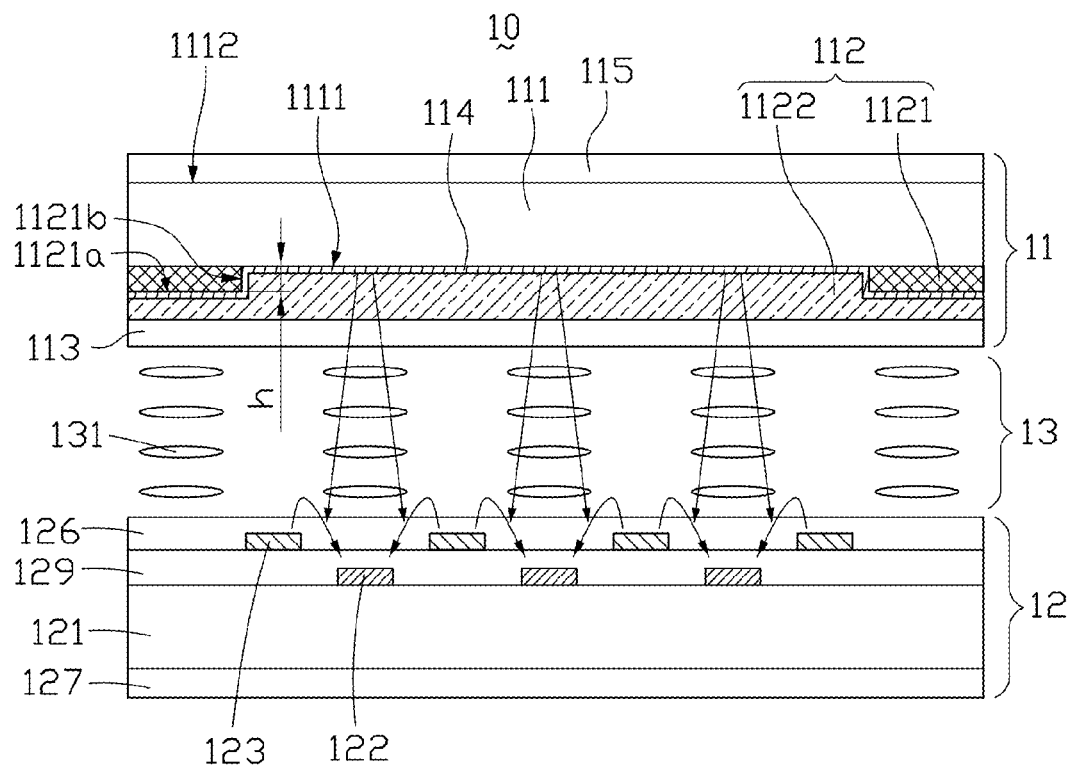
FIG. 3 is a cross-sectional view of another example of the LCD device according to the first embodiment of the present invention.
Figure 4:
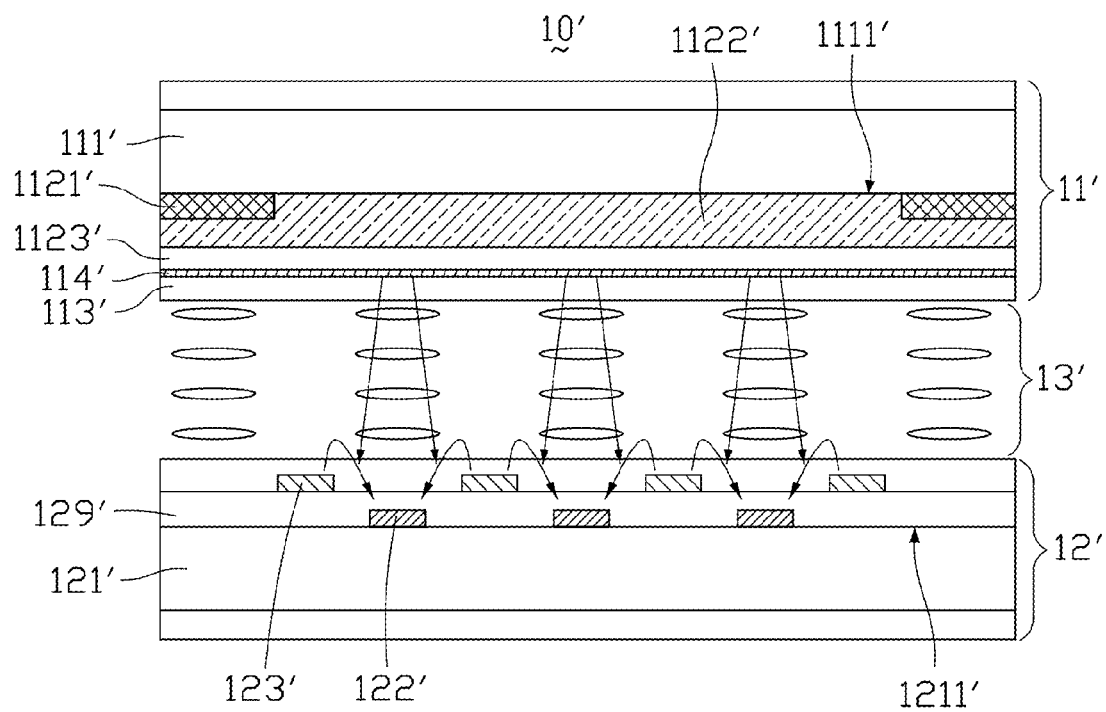
FIG. 4 is a cross-sectional view of an LCD device according to a comparing example.

Furthermore, for lower cost, in alternative embodiments, the over coat layer 1123 is omitted. That is, the first alignment film 113 is directly formed on a surface of the photoresist layer 1122 far away from the first transparent substrate 111. FIG. 3 is a cross-sectional view of another example of the LCD device according to the first embodiment of the present invention. Referring to FIG. 3, a difference between the LCD device 10 in FIG. 3 and the LCD device 10 in FIGS. 1-2 is that the over coat layers 1123 in FIGS. 1-2 are omitted in FIG. 3. The structure of other portions of the LCD device 10 in FIG. 3 is the same as those described above in FIGS. 1 and 2, and will not be described in detail here. Table 1 shows comparison results of transmittance, open response time (Ton), OFF response time (Toff), overall response time (RT), and center contrast degree (Center CR) between the LCD device 10 shown in FIGS. 1 and 2 (example 1), the LCD device 10 in the FIG. 3 (example 2) and a comparing example in a simulation experiment. Referring to FIG. 4, FIG. 4 is a cross-sectional view of an LCD device 10' according to the comparing example. The LCD device 10' includes a first substrate 11', a second substrate 12' disposed opposite to the first substrate 11', and a LC layer 13' sandwiched between the first substrate 11' and the second substrate 12'. The first substrate 11' includes a first transparent substrate 111'. Each portion of the first substrate 11' corresponding to one pixel area includes a black matrix layer 1121', a photoresist layer 1122', an over coat layer (OC layer) 1123', an electrode layer 114' and a first alignment film 113'. The black matrix layer 1121', the photoresist layer 1122', the over coat layer (OC layer) 1123', the electrode layer 114' and the first alignment film 113' are formed on a first surface 1111' of the first transparent substrate 111' sequentially. The second substrate 12' includes a second transparent substrate 121'. Each portion of the second substrate 12' corresponding to one pixel area includes a second electrode 122' and a third electrode 123'. The second electrode 122' and the third electrode 123' are formed on the third surface 1211' of the second transparent substrate 121' sequentially. The second electrode 122' and the third electrode 123' are arranged at different insulation layers respectively, and an insulation layer 129' is disposed therebetween to electrically insulate the second electrode 122' and the third electrode 123'. One of the second electrode 122' and the third electrode 123' is a pixel electrode, and the other is a common electrode.

It should to be noted, the data in Table 1 is obtained in the case that the structure of the second substrate 12' in the comparing example is same as that of the second substrate 12 in the example 1 and the example 2, the thickness of the LC layer 13' in the comparing example is same as the thickness of the LC layer 13 in the example 1 and example 2, and the electrode layer 114' in the comparing example and the first electrodes 114 in the example 1 and example 2 are common electrodes.

TABLE 1

|  | comparing example | example 1 | example 2 |
| --- | --- | --- | --- |
| transmittance | 6.67% | 7.00% | 6.97% |
| Ton(ms) | 36.0686 | 20.5008 | 22.7553 |
| Toff(ms) | 26.9227 | 28.0716 | 27.9449 |
| RT(ms) | 62.9913 | 48.5724 | 50.7002 |
| Center CR | 3320.85 | 3549.21 | 2085.42 |

In the simulation experiment, the overall response time (RT) of the comparing example is about 62.99 ms, the overall response time (RT) of the example 1 is about 48.57 ms, and the overall response time (RT) of the example 2 is about 50.70 ms. Therefore, a response time of the LCD devices in the example 1 or the example 2 is faster than the response time of the LCD device in the comparing example, and a transmittance of the LCD device in the example 1 or the example 2 are improved.

In comparison with the LCD device in the comparing example, the first electrode 114 of the LCD device of the present invention is disposed between the photoresist layer 1122 and the first transparent substrate 111, and because of that, a distance between the first electrode 114 in the first substrate 11 and the second electrode 122 and the third electrode 123 in the second substrate 12 is increased, thereby weakening a vertical electric field between the first substrate 11 and the second substrate 12, so that the LCD device 10 has an improved transmittance and a faster response time.

Figure 5:
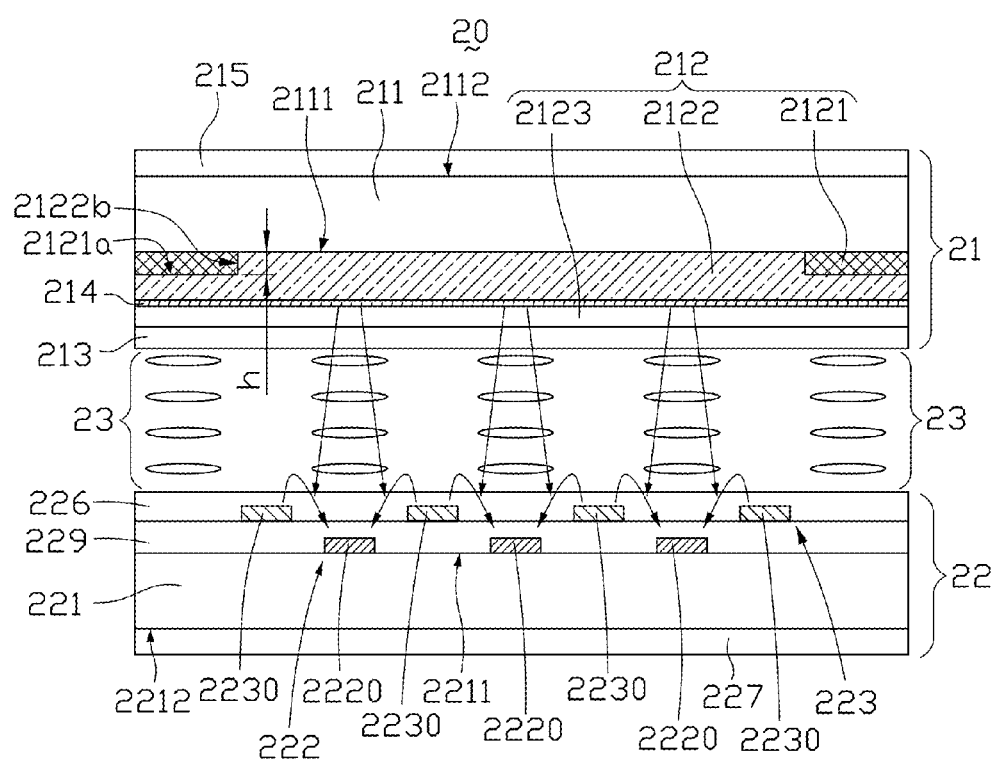
FIG. 5 is a cross-sectional view of an LCD device according to a second embodiment of the present invention.

FIG. 5 is a cross-sectional view of an LCD device 20 according to a second embodiment of the present invention. For simplicity and clarity of illustration, FIG. 5 only shows one pixel area of the LCD device 20. Referring to FIG. 5, in the second embodiment, the LCD device 20 includes a first substrate 21, a second substrate 22 disposed opposite to the first substrate 21, and an LC layer 23 sandwiched between the first substrate 21 and the second substrate 22.

Specifically, the first substrate 21 includes a first transparent substrate 211. The first transparent substrate 211 includes a first surface 2111 disposed adjacent to the second substrate 22 and a second surface 2112 disposed far away from the second substrate 22.

Each portion of the first substrate 21 corresponding to one pixel area further includes a color filter layer 212, a first alignment film 213 and a first electrode 214. The color filter layer 212 and the first alignment film 213 are formed on the first surface 2111 of the first transparent substrate 211 sequentially. The first electrode 214 is interlayered in the color filter layer 212.

In the second embodiment, the color filter layer 212 includes a black matrix layer 2121, a photoresist layer 2122 and an over coat layer 2123. The black matrix layer 2121 is formed on the first surface 2111 of the first transparent substrate 211, the photoresist layer 2122 is formed on the black matrix layer 2121, the first electrode 214 is formed on the photoresist layer 2122, and the over coat layer 2123 is formed on the first electrode 214. That is, different from the first embodiment, the first electrode 214 in the second embodiment is sandwiched between the photoresist layer 2122 and the over coat layer 2123. In the exemplary embodiment, the first alignment film 213 is directly formed on a surface of the over coat layer 2123.

Specifically, in the second embodiment, the black matrix layer 2121 is directly formed on the first surface 2111 of the first transparent substrate 211. The whole layer of the photoresist layer 2122 is formed on a bottom surface 2121a, a side surface 2121b of the black matrix layer 2121 and a portion of the first surface 2111 of the first transparent substrate 211 exposed from the black matrix layer 2121. The first electrode 214 is directly formed on a surface of the photoresist layer 2122 disposed far away from the first transparent substrate 211, and the over coat layer 2123 is directly formed on a surface of the first electrode 214 disposed far away from the first transparent substrate 211.

Furthermore, the LCD device 20 may still further includes a first polarizer 215 in the first substrate 21. The first polarizer 215 is formed on the second surface 2112 of the first transparent substrate 211.

In the second embodiment, the second substrate 22 includes a second transparent substrate 221. The second transparent substrate 221 includes a third surface 2211 disposed adjacent to the first substrate 21 and a fourth surface 2212 disposed far away from the first substrate 21.

Each portion of the second substrate 22 corresponding to one pixel area includes a second electrode 222 and a third electrode 223. The second electrode 222 and the third electrode 223 are formed on the third surface 2211 of the second transparent substrate 221 sequentially. The second electrode 222 and the third electrode 223 are arranged at different insulation layers respectively, and an insulation layer 229 is disposed therebetween to electrically insulate the second electrode 222 and the third electrode 223. One of the second electrode 222 and the third electrode 223 is a pixel electrode, and the other is a common electrode. Preferably, the second electrode 222 and the third electrode 223 are transparent electrode, and may be made of transparent conductor materials, such as ITO, for example.

In an exemplary embodiment of the present invention, the second electrode 222 may be a pixel electrode, and the third electrode 223 may be a common electrode. Wherein, the second electrode 222 includes a plurality of second electrode portions 2220. The second electrode portions 2220 are strip-shaped, substantially parallel to each other and electrically coupled with each other. The third electrode 223 includes a plurality of third electrode portions 2230. The third electrode portions 2230 are strip-shaped, substantially parallel to each other, electrically coupled with each other and electrically coupled to the common electrode bus (not shown).

Preferably, in each pixel area P, each third electrode portion 2230 is disposed between two corresponding adjacent second electrode portions 2220, and the third electrode portion 2230 is substantially parallel to the second electrode portion 2220. For example, each third electrode portion 2230 is disposed in the middle of the two corresponding adjacent second electrode portions 2220. In other embodiments of the present invention, other design of the structure of the second electrode and the third electrode can be applied, please referring to the following description (FIGS. 7-9 and FIGS. 14-15, for example), and the present invention is not limited thereto.

Furthermore, the LCD device 20 may still further includes a second alignment film 226 and a second polarizer 227 in the second substrate 22. Wherein the second alignment film 226 covers the third electrode 223, and the second polarizer 227 is formed on the fourth surface 2212 of the second transparent substrate 221.

In the second embodiment, the LC molecules 231 in the LC layer 23 may be negative LC molecules or positive LC molecules.

Table 2 shows comparison results of transmittance, open response time (Ton), OFF response time (Toff), overall response time (RT), and center contrast degree (Center CR) between the LCD device 20 shown in FIG. 5 (example 3) and the LCD device 10' of the comparing example (referring to FIG. 4) in a simulation experiment. It should be noted that, the data in Table 2 is obtained in the case that the structure of the second substrate 12' in the comparing example is same as that of the second substrate 22 in the example 3, the thickness of the LC layer 13' in the comparing example is same as the thickness of the LC layer 23 in the example 3, and the electrode layer 114' in the comparing example and the first electrode 214 in the example 3 are common electrode.

TABLE 2

|  | comparing example | example 3 |
| --- | --- | --- |
| transmittance | 6.67% | 7.00% |
| Ton(ms) | 36.0686 | 22.6103 |
| Toff(ms) | 26.9227 | 27.9664 |
| RT(ms) | 62.9913 | 50.5767 |
| Center CR | 3320.85 | 3595.16 |

In the simulation experiment, the overall response time (RT) of the comparing example is about 62.99 ms, and the overall response time (RT) of the example 3 is about 50.58 ms. Therefore, a response time of the LCD device 20 in the example 3 is faster than the response time of the LCD device 10' in the comparing example, and a transmittance of the LCD device 20 in example 3 is improved.

In comparison with the LCD device 10' in the comparing example, the first electrode 214 of the LCD device 20 of the example 3 of present invention is directly formed on the photoresist layer 2122, because of that, the distance between the first electrode 214 in the first substrate 21 and the second electrode 222 and the third electrode 223 in the second substrate 22 is increased, thereby weakening a vertical electric field between the first substrate and the second substrate, so that the LCD device has an improved transmittance and faster response time.

Figure 6:
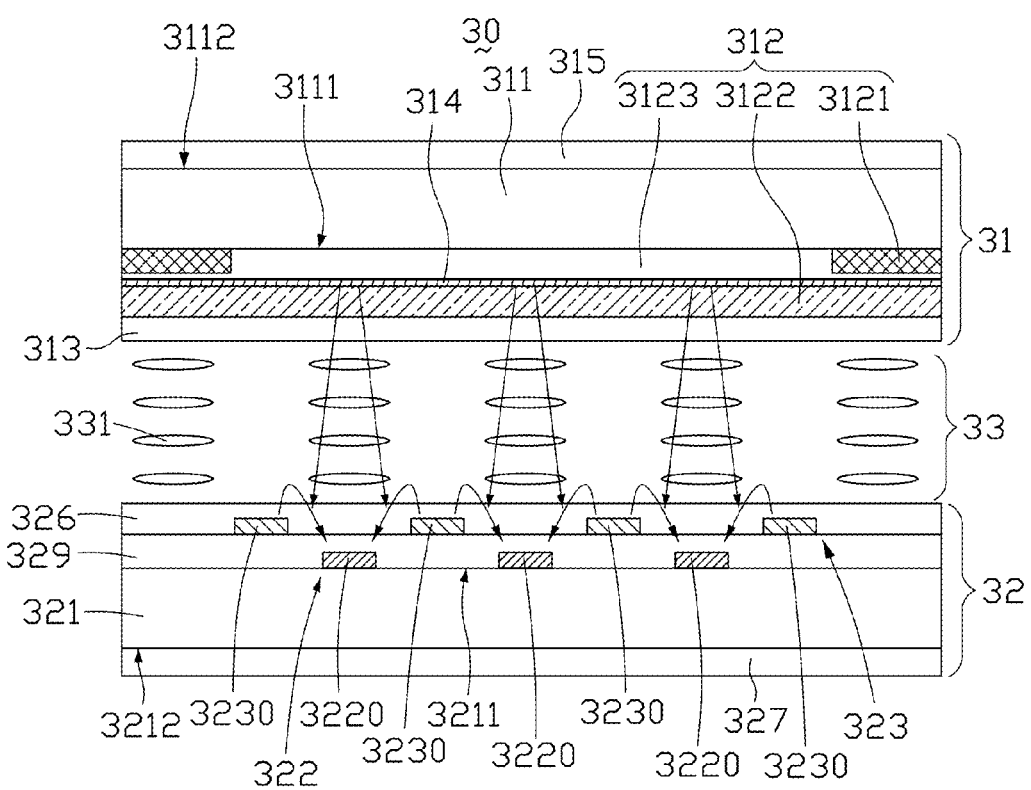
FIG. 6 is a cross-sectional view of an LCD device according to a third embodiment of the present invention.

FIG. 6 is a cross-sectional view of an LCD device 30 according to a third embodiment of the present invention. For simplicity and clarity of illustration, FIG. 6 only shows one pixel area of the LCD device 30. Referring to FIG. 6, in the third embodiment, the LCD device 30 includes a first substrate 31 a second substrate 32 disposed opposite to the first substrate 31, and a LC layer 33 sandwiched between the first substrate 31 and the second substrate 32.

Specifically, the first substrate 31 includes a first transparent substrate 311. The first transparent substrate 311 includes a first surface 3111 disposed adjacent to the second substrate 32 and a second surface 3112 disposed far away from the second substrate 32.

Each portion of the first substrate 31 corresponding to one pixel area further includes a color filter layer 312 formed on the first surface 3111 of the first transparent substrate 311, a first alignment film 313 sandwiched between the color filter layer 312 and the LC layer 33, and a first electrode 314 interlayered in the color filter layer 312.

In the third embodiment, the color filter layer 312 includes a black matrix layer 3121, a photoresist layer 3122 and an over coat layer 3123. Specifically, the black matrix layer 3121 is directly formed on the first surface 3111 of the first transparent substrate 311, the over coat layer 3123 is directly formed on the black matrix layer 3121 and a portion of the first surface 3111 of the first transparent substrate 311 exposed from the black matrix layer 3121, the first electrode 314 is directly formed on a surface of the over coat layer 3123 disposed far away from the first transparent substrate 311, the photoresist layer 3122 is directly formed on a surface of the first electrode 314 disposed far away from the first transparent substrate 311. A difference between the LCD device 30 in FIG. 6 and the LCD device 10 in FIGS. 1 and 2 is that the over coat layer 3123 is formed on the black matrix layer 3121 before the first electrode 314 being formed thereon. Therefore, an influence for the liquid crystal molecules 331, caused by an off difference of an overlapping region between the photoresist layer 3122 and the black matrix layer 3121, can be reduced. The off difference refers to a height difference between the black matrix layer and the first surface of the first transparent substrate, which in FIG. 2, FIG. 3, or FIG. 5 is marked as h. Preferably, the thickness of the over coat layer 3123 is greater than or equal to the thickness of the black matrix layer 3121.

Specifically, in the third embodiment, because the over coat layer 3123 is formed on the black matrix layer 3121 and the portion of the first surface 3111 of the first transparent substrate 311 first, then the first electrode 314 is formed on the over coat layer 3123, the first electrode 314 thus has a more flat surface. In comparison with the first electrode 114 in FIG. 2 or FIG. 3, the first electrode 314 in this embodiment has more flat surface on the overlapping region between the photoresist layer 3122 and the black matrix layer 3121. Because of that, changes of tilt angle of the liquid crystal molecules in the overlapping region are not obviously observable. That is, changes of tilt angle of the liquid crystal molecules caused by the unevenness of the first electrode can be reduced. Correspondingly, an influence for the viewing angle of the LCD device caused by the changing of the tilt angle of the liquid crystal molecules also can be reduced.

In this embodiment, the second substrate 32 includes a second transparent substrate 321. The second transparent substrate 321 includes a third surface 3211 disposed adjacent to the first substrate 31, and a fourth surface 3212 disposed far away from the first substrate 31. Each portion of the second substrate 32 corresponding to one pixel area includes a second electrode 322 and a third electrode 323. The second electrode 322 and the third electrode 323 are formed on the third surface 3211 of the second transparent substrate 321 sequentially. The second electrode 322 and the third electrode 323 are arranged at different insulation layers respectively, and an insulation layer 329 is disposed therebetween to electrically insulate the second electrode 322 and the third electrode 323. One of the second electrode 322 and the third electrode 323 is a pixel electrode, and the other is a common electrode. Preferably, the second electrode 322 and the third electrode 323 are transparent electrode, may be made of transparent conductor materials, such as ITO, for example.

In an exemplary embodiment of the present invention, the second electrode 322 may be a pixel electrode, and the third electrode 323 may be a common electrode. Wherein, the second electrode 322 includes a plurality of second electrode portions 3220. The second electrode portions 3220 are strip-shaped, substantially parallel to each other and electrically coupled with each other. The third electrode 323 includes a plurality of third electrode portions 3230. The third electrode portions 3230 are strip-shaped, substantially parallel to each other, electrically coupled with each other and electrically coupled to the common electrode bus (not shown). Preferably, in each pixel area P, each third electrode portion 3230 is disposed between two corresponding adjacent second electrode portions 3220, and the third electrode portions 3230 is substantially parallel to the second electrode portion 3220. For example, each third electrode portion 3230 is disposed in the middle of the two corresponding adjacent second electrode portions 3220.

In alternative embodiments of the present invention, other designs of the structure of the second electrode and the third electrode can be applied, please referring to the following description (FIGS. 7-9 and FIGS. 14-15, for example), and the present invention is not limited thereto.

Furthermore, the LCD device 30 may still further includes a second alignment film 326 and a second polarizer 327 in the second substrate 32. Wherein, the second alignment film 326 covers the third electrode 323, and the second polarizer 327 is formed on the fourth surface 3212 of the second transparent substrate 321.

In the exemplary embodiment, the LC molecules 331 in the LC layer 33 can be negative LC molecules or positive LC molecules.

Table 3 shows comparison results of transmittance, open response time (Ton), OFF response time (Toff), overall response time (RT), and center contrast degree (Center CR) between the LCD device shown in FIG. 6 (example 4) and the comparing example (in FIG. 4) in a simulation experiment. It should to be noted, the data in Table 3 is obtained in the case that the structure of the second substrate 12' in the comparing example is same as that of the second substrate 32 in the example 4, the thickness of the LC layer 13' in the comparing example is same as the thickness of the LC layer 33 in the example 4, and the electrode layer in the comparing example and the first electrodes 314 in the example 4 is common electrode.

TABLE 3

|  | comparing example | example 4 |
| --- | --- | --- |
| transmittance | 6.67% | 7.01% |
| Ton(ms) | 36.0686 | 22.6184 |
| Toff(ms) | 26.9227 | 28.0002 |
| RT(ms) | 62.9913 | 50.6186 |
| Center CR | 3320.85 | 3170.25 |

In the simulation experiment, the overall response time (RT) of the comparing example is about 62.99 ms, and the overall response time (RT) of the example 4 is about 50.62 ms. Therefore, the response time of the LCD devices in the example 4 is faster than the response time of the LCD device in the comparing example, and a transmittance of the LCD device in example 4 is improved.

In comparison with the LCD device in the comparing example, the first electrode 314 of the LCD device 30 of example 4 of the present invention is placed between the over coat layer 3123 and the photoresist layer 3122, because of that, the distance between the first electrode 314 in the first substrate 31 and the second electrode 322 and the third electrode 323 in the second substrate 32 is increased, thereby weakening a vertical electric field between the first substrate 31 and the second substrate 32, so that the LCD device has an improved transmittance and fast response time. On the other hand, because the over coat layer 3123 is formed on the black matrix layer 3121 and the portion of the first surface 3111 of the first transparent substrate 311 first, then the first electrode 314 is formed on the over coat layer 3123, the first electrode 314 has a more flat surface. The first electrode 314 in this embodiment has more flat surface on the overlapping region between the photoresist layer 3122 and the black matrix layer 3121. Because of that, changes of tilt angle of the liquid crystal molecules in the overlapping region are not observable. That is, changes of tilt angle of the liquid crystal molecules caused by the unevenness of the first electrode can be reduced. Correspondingly, an influence for the viewing angle of the LCD device caused by the changing of the tilt angle of the liquid crystal molecules also can be reduced.

Figure 7:
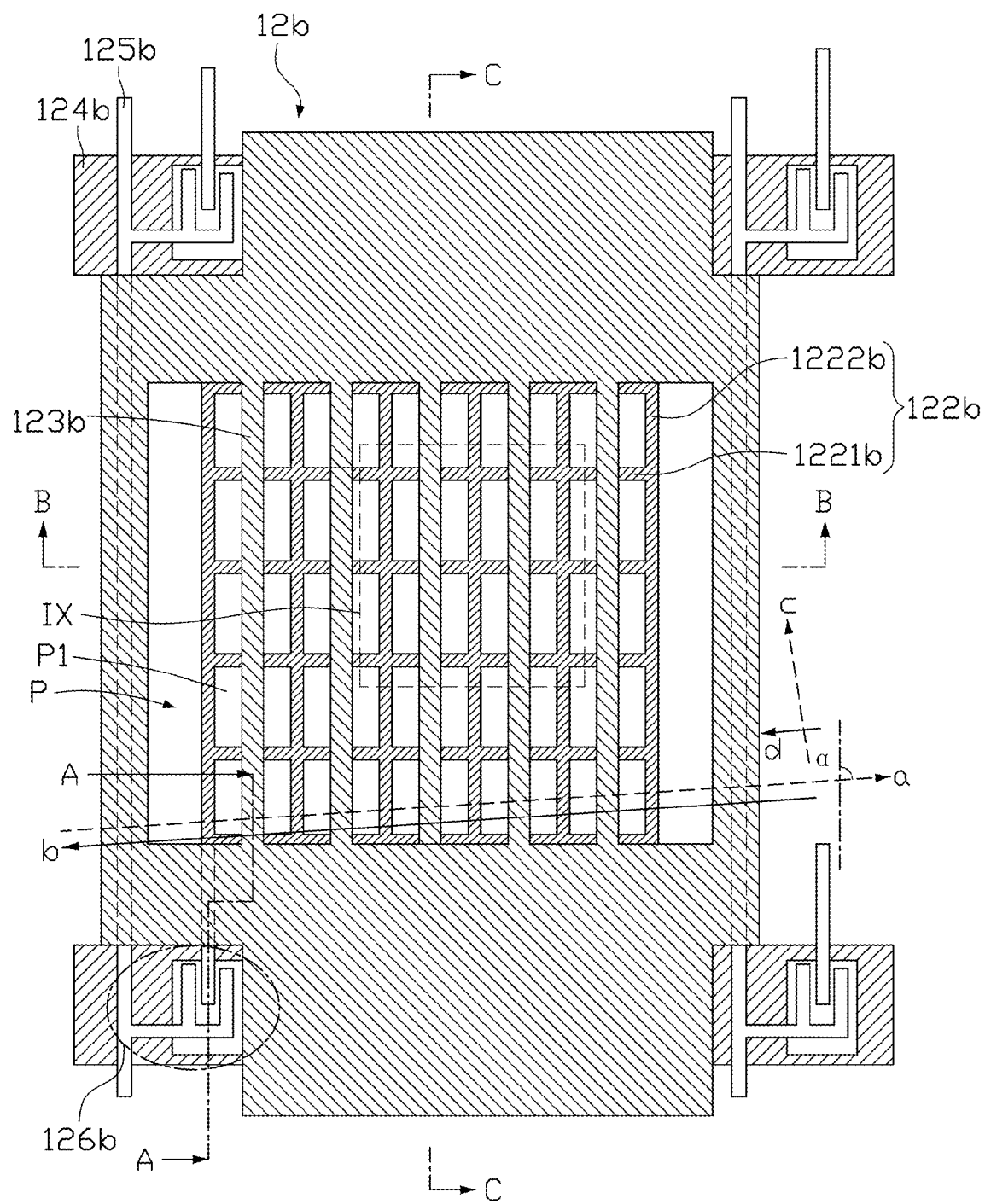
FIG. 7 is a plan view of the second substrate in an exemplary structure of the first embodiment of the present invention.
Figure 8A:
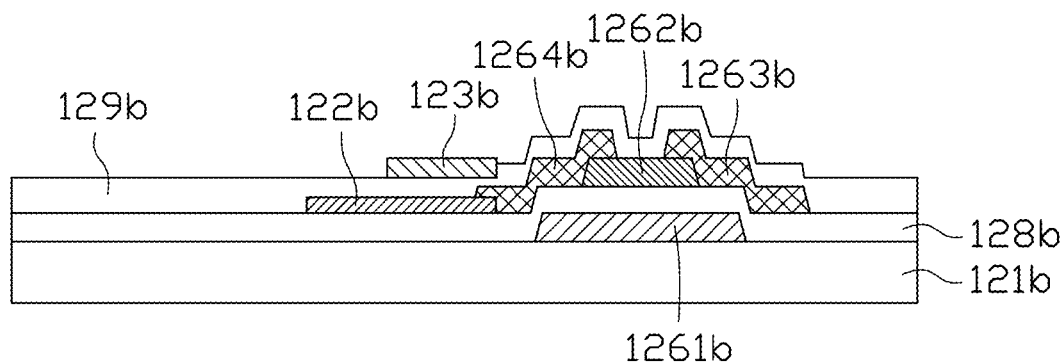
FIG. 8a is a cross-sectional view taken along the line A-A in FIG. 7.
Figure 8B:
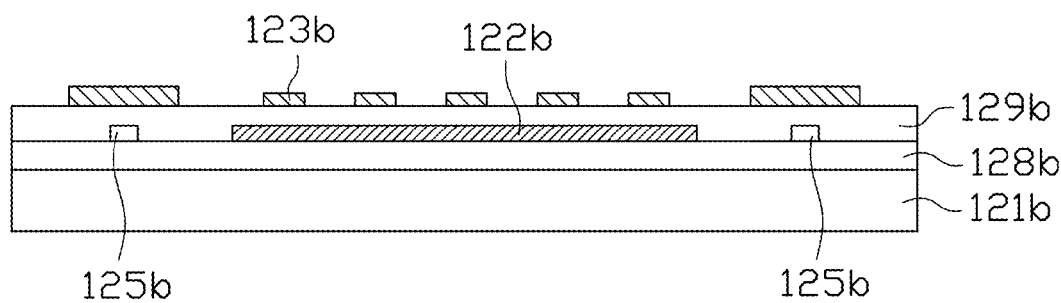
FIG. 8b is a cross-sectional view taken along the line B-B in FIG. 7.
Figure 8C:
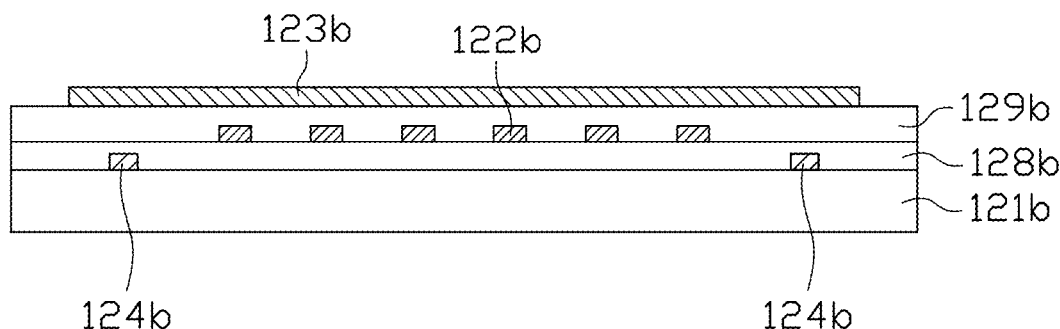
FIG. 8c is a cross-sectional view taken along the line C-C in FIG. 7.

FIG. 7 is a plan view of the second substrate in an exemplary structure of the first embodiment of the present invention. FIG. 8a is a cross-sectional view taken along the line A-A in FIG. 7. FIG. 8b is a cross-sectional view taken along the line B-B in FIG. 7. FIG. 8c is a cross-sectional view taken along the line C-C in FIG. 7.

Referring to FIGS. 7, 8a, 8b and 8c, in the exemplary embodiment, a second substrate 12b in the LCD device includes a second transparent substrate 121b, a plurality of gate lines 124b, a plurality of data lines 125b and a plurality of thin film transistors (TFTs) 126b disposed at intersections of the gate lines 124b and the data lines 125b. The gate lines 124b, the data lines 125b and the TFTs 126b are formed on the second transparent substrate 121b. Each TFT 126b includes a gate electrode 1261b, a semiconductor layer 1262b, a source electrode 1263b, and a drain electrode 1264b. As known to persons skilled in the art, the gate electrode 1261b is configured for receiving a signal from one corresponding gate line 124b, and the source electrode 1263b is configured for receiving a signal from one corresponding data line 125b. A gate insulation layer 128b is formed between the gate electrode 1261b and the semiconductor layer 1262b. Furthermore, a passivation layer 129b is formed between a second electrode 122b and a third electrode 123b to electrically insulate the second electrode 122b and the third electrode 123b.

The gate lines 124b and the data lines 125b are insulated and intersected with each other to define a plurality of pixel areas P. That is, each two adjacent gate lines 124b and each two adjacent data lines 125b are intersected with each other to define one pixel area P. Preferably, the gate lines 124b are substantially perpendicular to the data lines 125b. Preferably, each pixel area P includes at least two sub-pixel areas P1. The number of the sub-pixel areas P1 shown in FIG. 7 is for purpose of illustration and description only, and it is not intended to be exhaustive or to be limiting to the precise form disclosed. The number of the sub-pixel areas P1 can be reasonably disposed or configured according to size of actual LCD device and the manufacturing process level.

Figure 9:
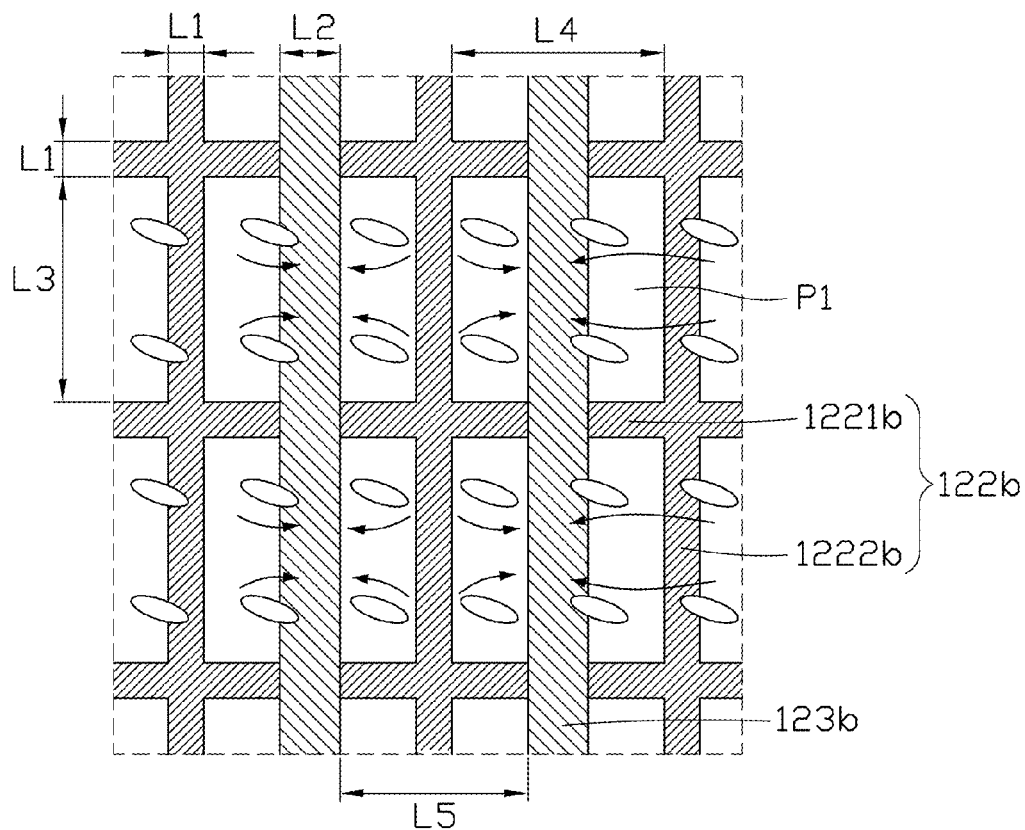
FIG. 9 is a partial enlarged view of part IX in FIG. 7.

FIG. 9 is a partial enlarged view of part IX of FIG. 7. Referring to FIG. 9, in the exemplary embodiment, the second electrode 122b has a mesh-shaped structure, and includes a plurality of first pixel electrode portions 1221b and a plurality of second pixel electrode portions 1222b. The first pixel electrode portions 1221b and the second pixel electrode portions 1222b are arranged at the same layer, and are intersected with each other to define the plurality of pixel areas P1. The first pixel electrode portions 1221b each is approximately strip-shaped and substantially parallel to each other, and are electrically coupled to each other. The second pixel-electrode portions 1222b each is approximately strip-shaped and substantially parallel to each other, and are electrically coupled to each other. In addition, the first pixel-electrode portions 1221b and the second pixel-electrode portions 1222b are electrically coupled together, thereby to form the second electrode 122b of the pixel area P, and the second electrode 122b is electrically coupled to the drain electrode 1264b of a corresponding TFT 126b (Referring to FIG. 8a).

Preferably, the first pixel electrode portions 1221b are substantially perpendicular to the second pixel electrode portions 1222b. The first pixel electrode portions 1221b are substantially parallel to the gate lines 124b, and the second pixel electrode portions 1222b are substantially parallel to the data lines 125b. Therefore, the LCD device has a more orderly pixel structure.

The third electrodes 123b of the pixel area P each are approximately strip-shaped and substantially parallel to each other and electrically coupled to each other, and are electrically coupled to a common electrode bus (not labeled). In this embodiment, in each pixel area P, each third electrode 123b is disposed between two corresponding adjacent second pixel electrode portions 1222b, and is substantially parallel to the second pixel electrode portions 1222b. Preferably, each third electrode 123b is disposed in the middle between two corresponding adjacent second pixel electrode portions 1222b.

Preferably, the third electrodes 123b are disposed substantially perpendicular to the first pixel electrode portions 1221b and substantially parallel to the second pixel electrode portions 1222b. One of ordinarily skill in the art can understand that, in alternative embodiments, a certain angle can be defined between the third electrode 123b and the first pixel electrode portions 1221b. For example, the angle between the third electrode 123b and the first pixel electrode portions 1221b can be defined in a range from about 50 degrees to about 150 degrees, to improve the response speed of the LC molecules.

In the exemplary embodiment, the first pixel electrode portions 1221b and the second pixel electrode portions 1222b each has a width L1 in a range from about 2 μm to about 5 μm. In order to avoid disclination lines generated directly above the first pixel electrode portions 1221b and the second pixel electrode portions 1222b, the width L1 of the first pixel electrode portions 1221b and the second pixel electrode portions 1222b is better to have a smaller size. However, limited to the actual manufacturing process capability, according to process yield requirements, the width L1 is preferably in the range from 2 μm to 5 μm. Preferably, the third electrodes 123b each has a width L2 in a range from about 2 μm to 5 μm.

In the exemplary embodiment, in the pixel area P, a gap width L3 defined between each two adjacent first pixel electrode portions 1221b can be greater than 0 and less than or equal to 6 μm. A gap width L4 defined between each two adjacent second pixel electrode portions 1222b can be greater than 0 and less than or equal to 6 μm. Such size or width ranges are disposed or configured based on the actual utilization of electric field, and it is difficult to achieve a desired or satisfactory result if the gap widths are too large. A gap width L5 defined between each two adjacent third electrodes 123b can be greater than or equal to 3 μm and less than or equal to 8 μm. Limited to the actual manufacturing process capability, it is difficult to achieve a desired result if the gap width L5 exceeds the maximal value of the range, and it is harder to manufacture an actual LCD device product if the gap width L5 is configured below the minimal value of the range. Therefore, the gap width L5 is preferably disposed or configured in a range from about 3 μm to about 8 μm.

Furthermore, in the exemplary embodiment, referring to FIG. 7, a friction direction "a" of the first alignment film is opposite to a friction direction "b" of the second alignment film. A polarization axis "c" of the first polarizer has a direction substantially perpendicular to the direction of a polarization axis "d" of the second polarizer.

Furthermore, in the exemplary embodiment, LC molecules in the LC layer can be negative LC molecules or positive LC molecules. If the LC molecules in the LC layer is negative LC molecules, an angle "α" defined between an arrangement direction of the third electrode 123b and the friction direction b of the second alignment film (not shown in FIG. 7) is preferably in a range from 60 degrees to 85 degrees. If the LC molecules in the LC layer is positive LC molecules, the angle "α" defined between an arrangement direction of the third electrode 123b and the friction direction b of the second alignment film is preferably in a range from 5 degrees to 30 degrees. Therefore, the LC molecules have fast response time and can twist along the certain direction based on a large amount of torque when the LCD device operates, and a transmittance of the LCD device is improved. Further, due to the friction directions "a" and "b", the LC molecules have a pretilt angle in a range from 0 to 4 degrees. The pretilt angle makes the LC molecules 131 keep rotating in a horizontal plane under electric field, and improves the viewing angle.

Figure 10A:
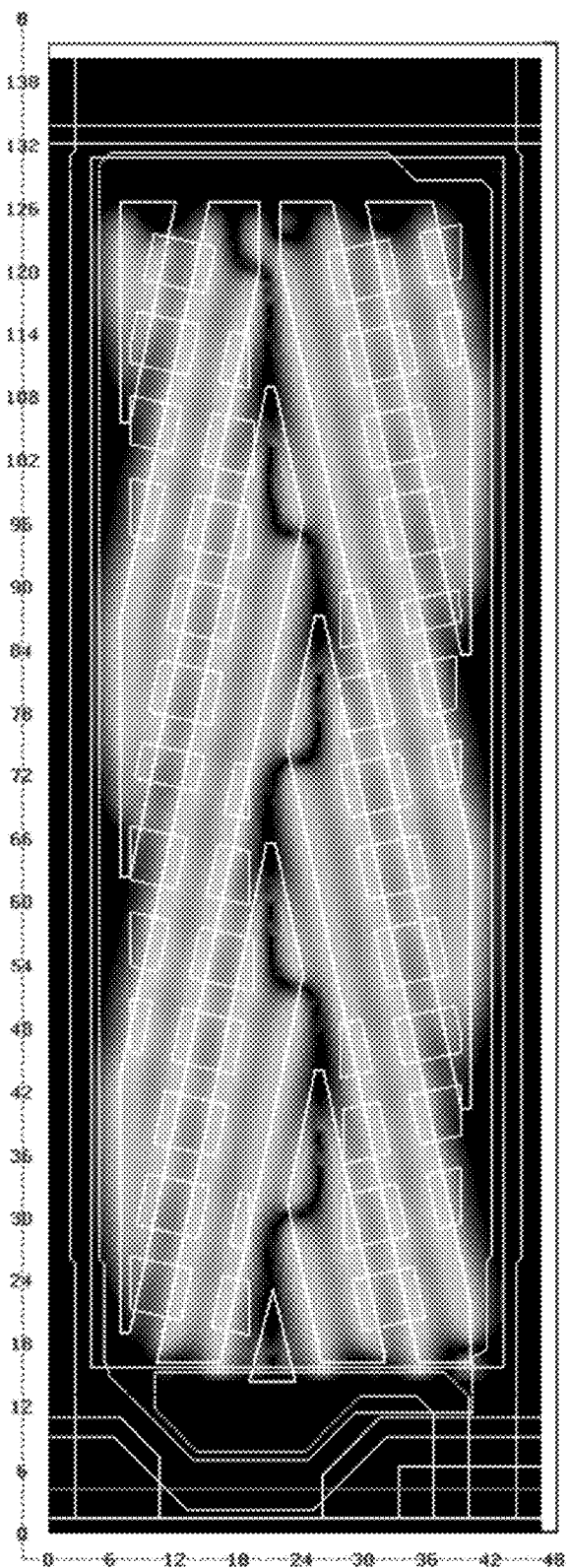
FIG. 10a is an effect diagram illustrating a transmittance of the LCD device according to an example 5.
Figure 10B:
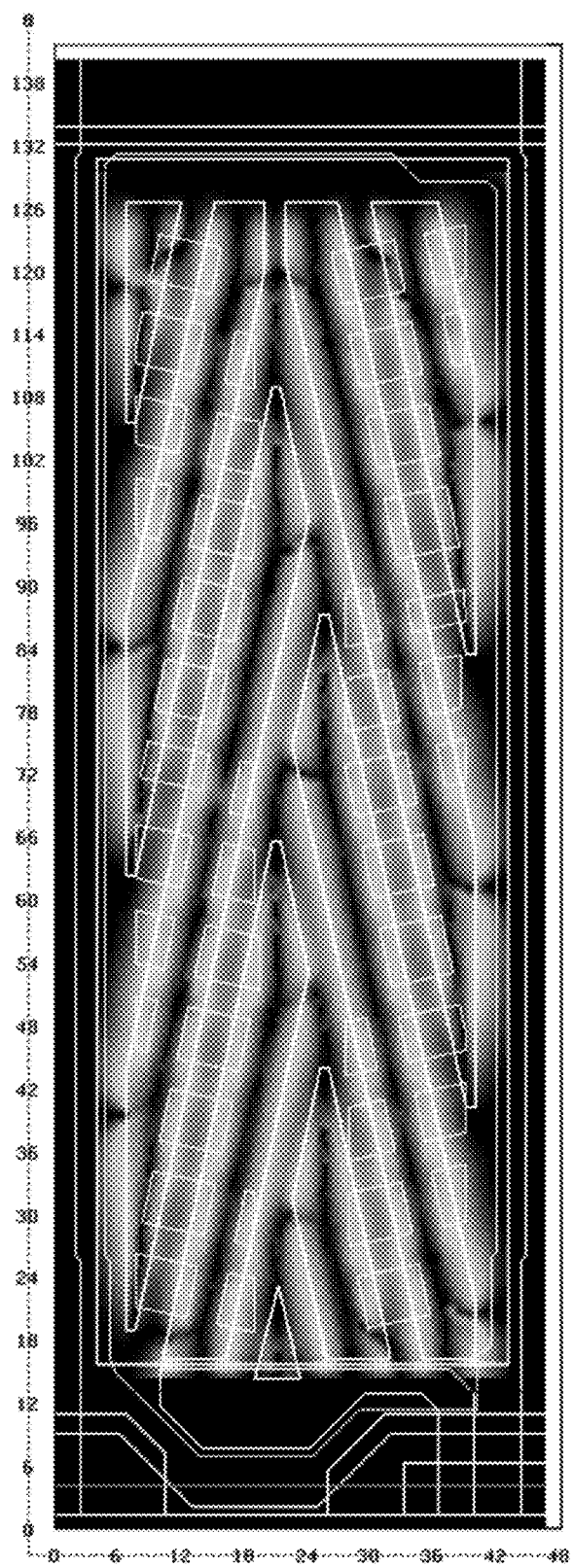
FIG. 10b is an effect diagram illustrating a transmittance of the LCD device according to an example 6.
Figure 10C:
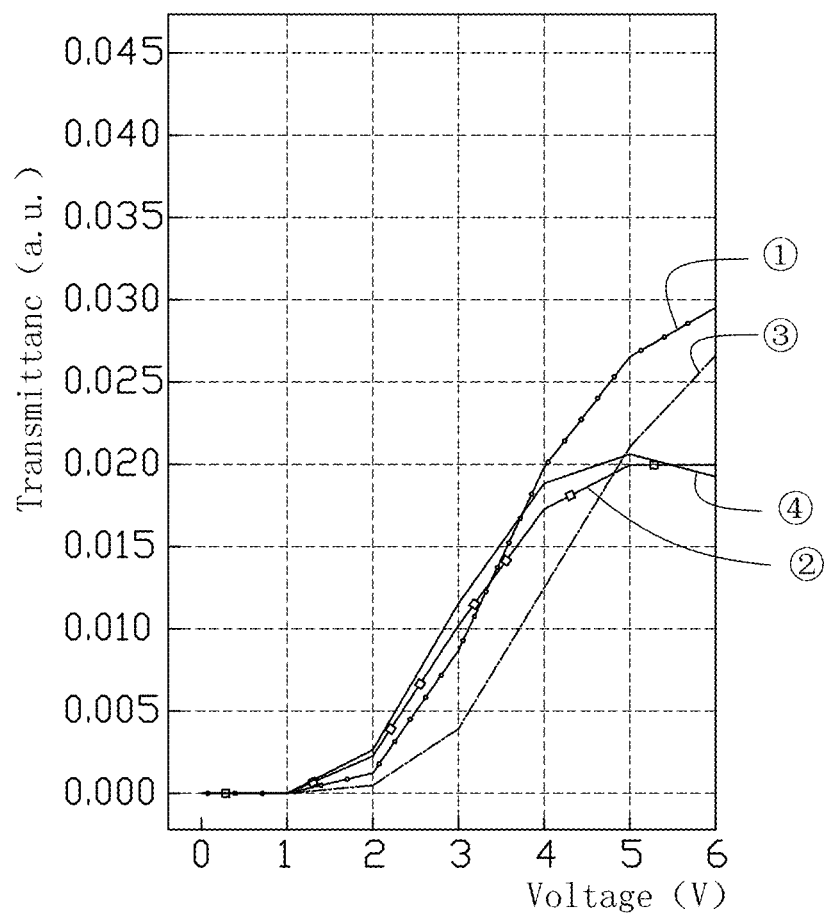
FIG. 10c is a comparison plot diagram between the LCD devices in the example 5, the example 6, an example 7 and an example 8 based on a relationship of transmittance and voltage.

FIG. 10a is an effect diagram illustrating a transmittance of the LCD device in an example 5. The LCD device in the example 5 is the LCD device in FIG. 2, FIG. 7 to FIG. 9 applying or using negative LC molecules. FIG. 10b is an effect diagram illustrating a transmittance of the LCD device in an example 6. The LCD device in the example 6 is the LCD device in FIG. 2, FIG. 7 to FIG. 9 applying or using positive LC molecules. FIG. 10c is a comparison plot diagram between the LCD devices in the example 5, example 6, example 7 and example 8 based on a relationship of transmittance and voltage. The LCD device in the example 7 is the LCD device in the FIG. 4 applying negative LC molecules. The difference between the LCD device in the example 8 and the LCD device in the example 7 is that the first substrate in the example 8 includes no first electrode and the LC molecules in the LC layer in the example 8 are positive LC molecules.

Specifically, referring to FIG. 10c, a curve ① comprising data points denotes a relationship of transmittance and voltage of the LCD device in the example 5, a curve ② comprising data points denotes a relationship of transmittance and voltage of the LCD device in the example 6, a curve ③ a comprising data points denotes a relationship of transmittance and voltage of the LCD device in the example 7, a curve ④ comprising data points denotes a relationship of transmittance and voltage of the LCD device in the example 8. Referring to FIG. 10c, when the voltage is equal to 5V, the transmittance of the example 5 is 0.026588, the transmittance of the example 7 is 0.021085. That means, when the voltage is 5V, the light transmittance of the LCD device in the example 5 is improved by about 25% than the transmittance of the LCD device in the example 7. When the voltage is equal to 4V, the transmittance of the example 5 is 0.01989, the transmittance of the example 7 is 0.012304. That means, when the voltage is 4V, the transmittance of the LCD device in the example 5 is improved by about 60% than the transmittance of the LCD device in the example 7. When the voltage is equal to 5V, the transmittance of the example 6 is 0.019997, the transmittance of the example 8 is 0.020647. That means, when the voltage is 5V, the transmittance of the LCD device in the example 6 is less than the transmittance of the LCD device in the example 8 up to 4%, having no significant decrease. When the voltage is equal to 4V, the transmittance of the example 6 is 0.017397, the transmittance of the example 8 is 0.0189. That means, when the voltage is 4V, the transmittance of the LCD device in the example 5 is less than the transmittance of the LCD device in the example 7 up to 8%, having no significant decrease. In addition, when the voltage is 4V, the transmittance of the LCD device in the example 5 is improved by about 40% than the transmittance of the LCD device in the example 7. As can be seen from the above data, the present invention is compatible with positive LC molecules.

Figure 11:
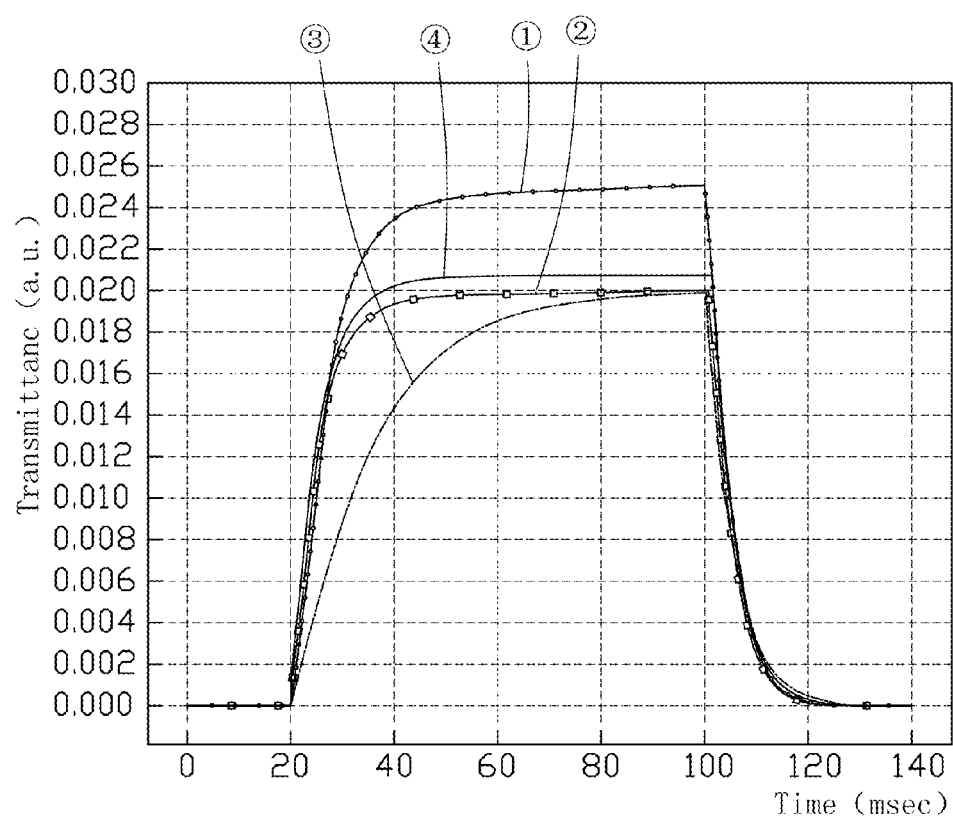
FIG. 11 is a comparison plot diagram between the LCD devices in the example 5, the example 6, the example 7 and the example 8 based on a relationship of transmittance and response time.
Figure 12A:
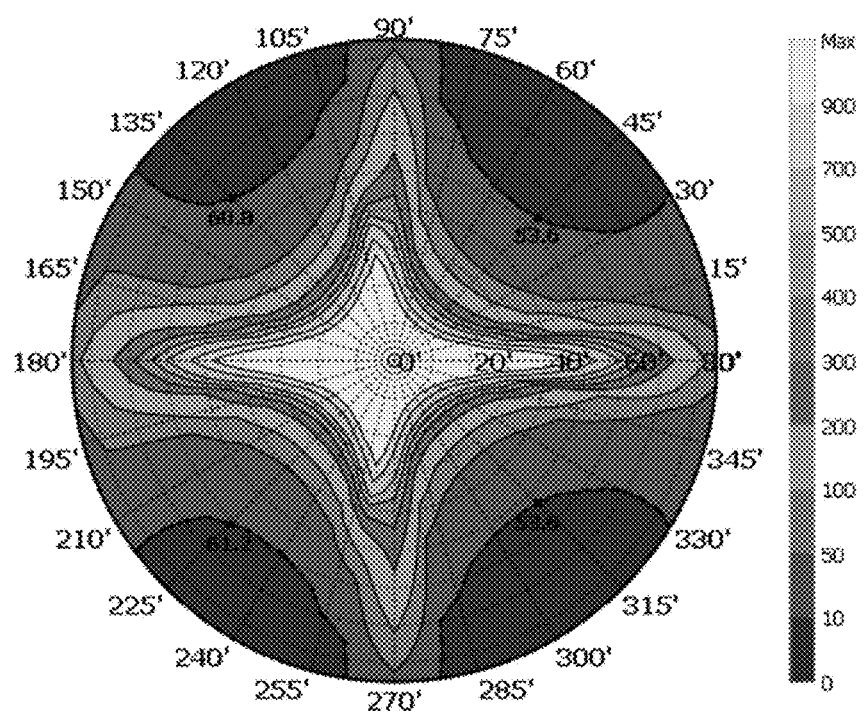
FIG. 12a is an effect diagram indicating a viewing angle range of the LCD device according to the example 5.
Figure 12B:
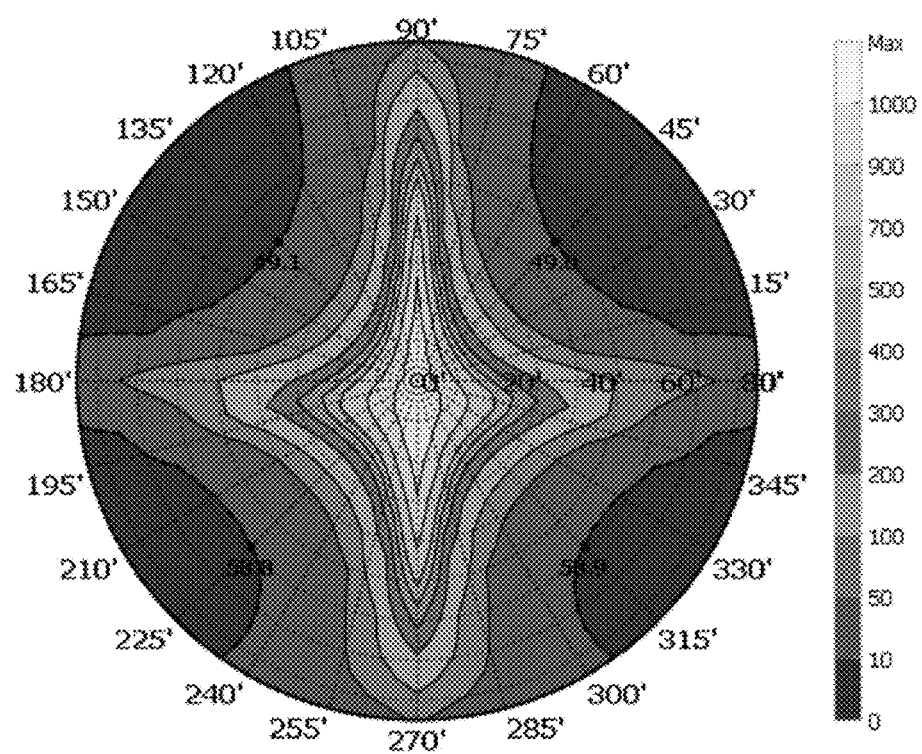
FIG. 12b is an effect diagram indicating a viewing angle range of the LCD device according to the example 6.
Figure 12C:
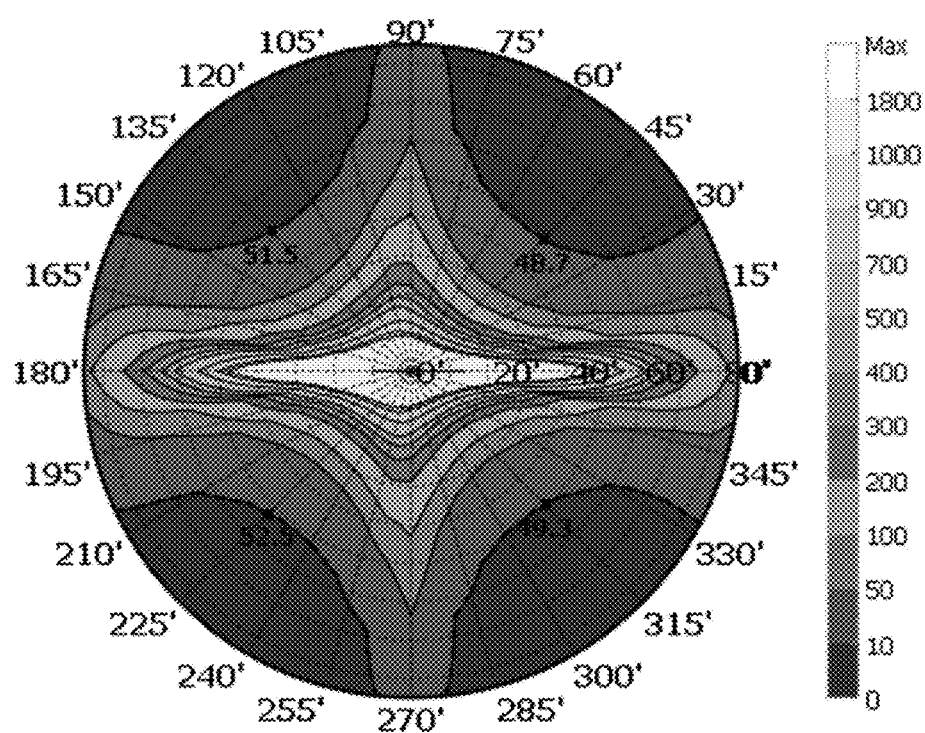
FIG. 12c is an effect diagram indicating a viewing angle range of the LCD device according to the example 7.
Figure 12D:
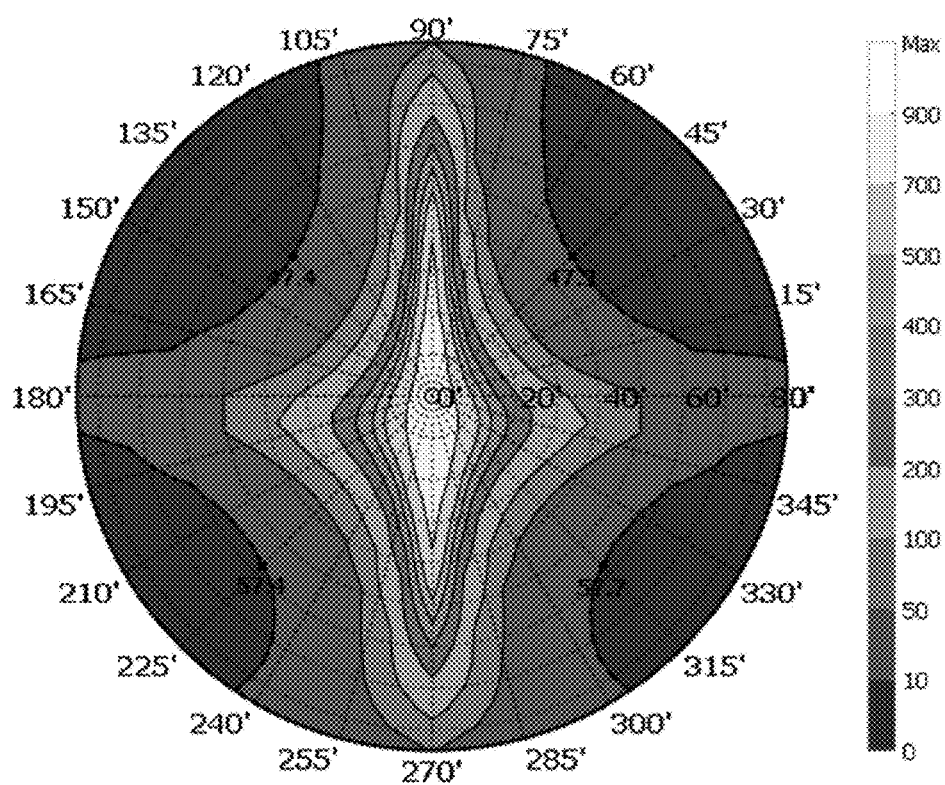
FIG. 12d is an effect diagram indicating a viewing angle range of the LCD device according to the example 8.

FIG. 11 is a comparison effect diagram between the LCD devices in the example 5, example 6, example 7 and example 8 based on a relationship of transmittance and response time. Specifically, referring to FIG. 11, a curve ① comprising data points denotes a relationship of transmittance and response time of the LCD device in the example 5, a curve ② comprising data points denotes a relationship of transmittance and response time of the LCD device in the example 6, a curve ③ comprising data points denotes a relationship of transmittance and response time of the LCD device in the example 7, a curve ④ comprising data points denotes a relationship of transmittance and response time of the LCD device in the example 8. Referring to FIG. 11, in a simulation experiment, a turn-on response time (Ton) of the LC molecules in the example 5 is approximately equal to 14.69 ms, and a turn-off response time (Toff) of the molecules in the example 5 is approximately equal to 9.28 ms. In the simulation experiment, the turn-on response time (Ton) of the LC molecules in the example 6 is approximately equal to 11.39 ms, and a turn-off response time (Toff) of the molecules in the example 6 is approximately equal to 9.62 ms. The turn-on response time (Ton) of the LC molecules in the example 7 is above 30 ms (32.02 ms in the simulation experiment, actual measured value is 34.37 ms), and a turn-off response time (Toff) of the molecules in the example 7 is above 12 ms (12.19 ms in the simulation experiment, actual measured value is 13.1 ms). That is, the embodiments in the present invention have faster response time than the example 7, whether the positive LC molecules are applied or utilized or the negative LC molecules are applied. When the negative LC molecules are applied in the embodiments of the present invention, the LCD device has higher transmittance. Compared with the example 8, the LCD device of the present invention has a substantially faster response time, the structural difference therebetween is small, both can achieve a performance level of a conventional LCD device.

FIGS. 12a, 12b, 12c and 12d are effect diagram respectively indicating a viewing angle range of the LCD device of example 5, example 6, example 7 and example 8. It can be seen from FIGS. 12a, 12b, 12c and 12d that, either positive LC molecules or negative LC molecules are applied, the LCD device of the present invention has an excellent wide viewing angle, both vertical and horizontal directions can reach 180 degrees. The LCD device of the present invention applying negative LC molecules has more excellent viewing angle and center high-contrast areas than the LCD device of the present invention applying positive LCD molecules and the LCD device of the example 7.

Figure 13A:
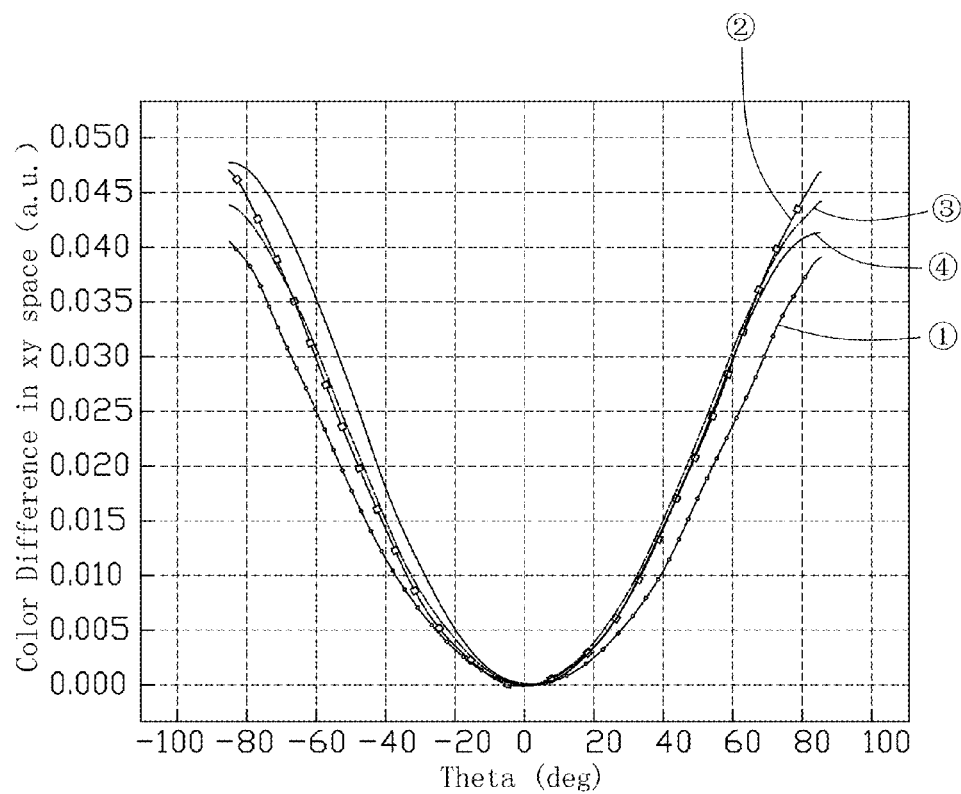
FIG. 13a is a comparison plot diagram between the LCD device of the example 5, the example 6, the example 7 and the example 8 based on a relationship of chromatic aberration and angle, in the direction of 90 degrees.
Figure 13B:
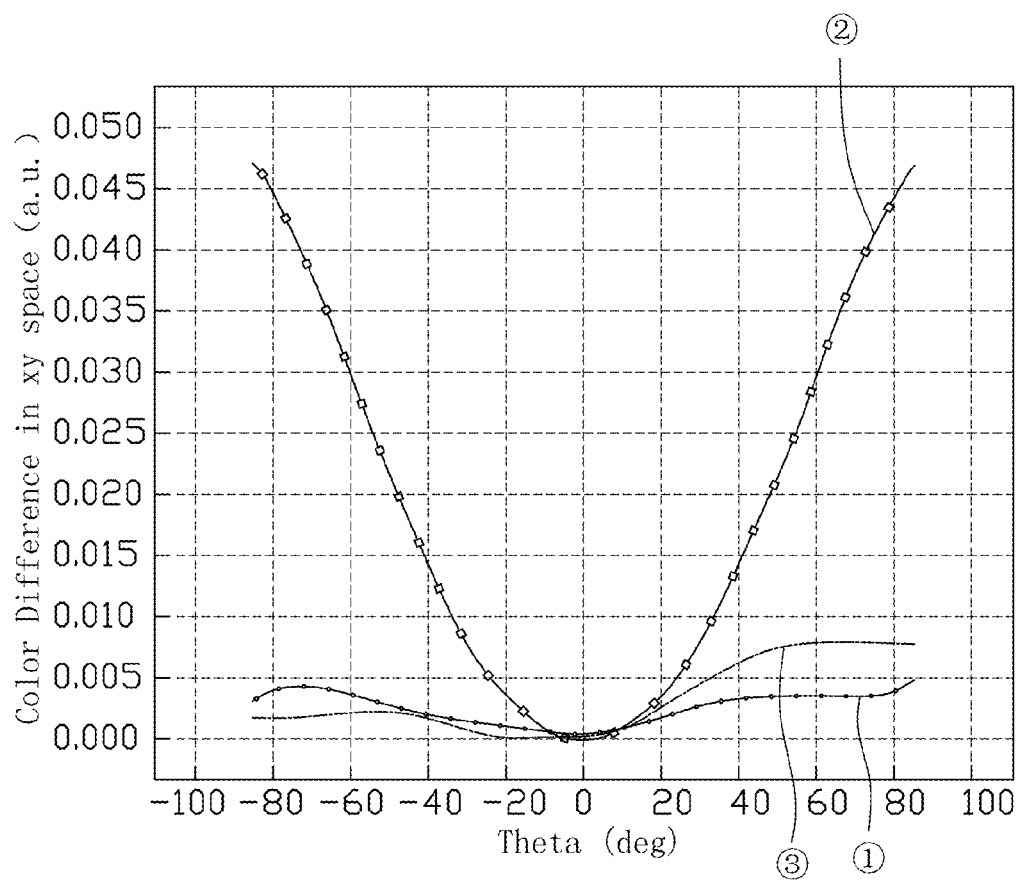
FIG. 13b is a comparison plot diagram between the LCD device of the example 5, the example 6 and the example 7 based on a relationship of chromatic aberration and angle, in the direction of 0 degree.

FIG. 13a is a comparison plot diagram between the LCD device of the example 5, the example 6, the example 7 and the example 8 based on a relationship of chromatic aberration and angle, in the direction of 90 degrees. Referring to FIG. 13a, curves ①, ②, ③, ④ are generated under the same simulated conditions, the curve ① denotes the relationship of chromatic aberration and angle of the LCD device of the example 5, in the direction of 90 degrees, the curve ② denotes the relationship of chromatic aberration and angle of the LCD device of the example 6, in the direction of 90 degrees, the curve ③ denotes the relationship of chromatic aberration and angle of the LCD device of the example 7, in the direction of 90 degrees, the curve ④ denotes the relationship of chromatic aberration and angle of the LCD device of the example 8, in the direction of 90 degrees. FIG. 13b is a comparison plot diagram between the LCD device of the example 5, the example 6 and the example 7 based on a relationship of chromatic aberration and angle, in the direction of 0 degree. Referring to FIG. 13b, curves ①, ②, ③ are generated under the same simulated conditions, the curve ① denotes the relationship of chromatic aberration and angle of the LCD device of the example 5, in the direction of 0 degree, the curve ② denotes the relationship of chromatic aberration and angle of the LCD device of the example 6, in the direction of 0 degree, the curve ③ denotes the relationship of chromatic aberration and angle of the LCD device of the example 7. It can be seen from FIG. 13a and FIG. 13b, when the angle varies, variation of the chromatic aberration of the LCD devices of examples 5, 6, 7 are small, The LCD device of the present invention applying negative LC molecules has smaller chromatic aberration than the LCD device of the present invention applying positive LCD molecules and the LCD device of the example 7.

Figure 14:
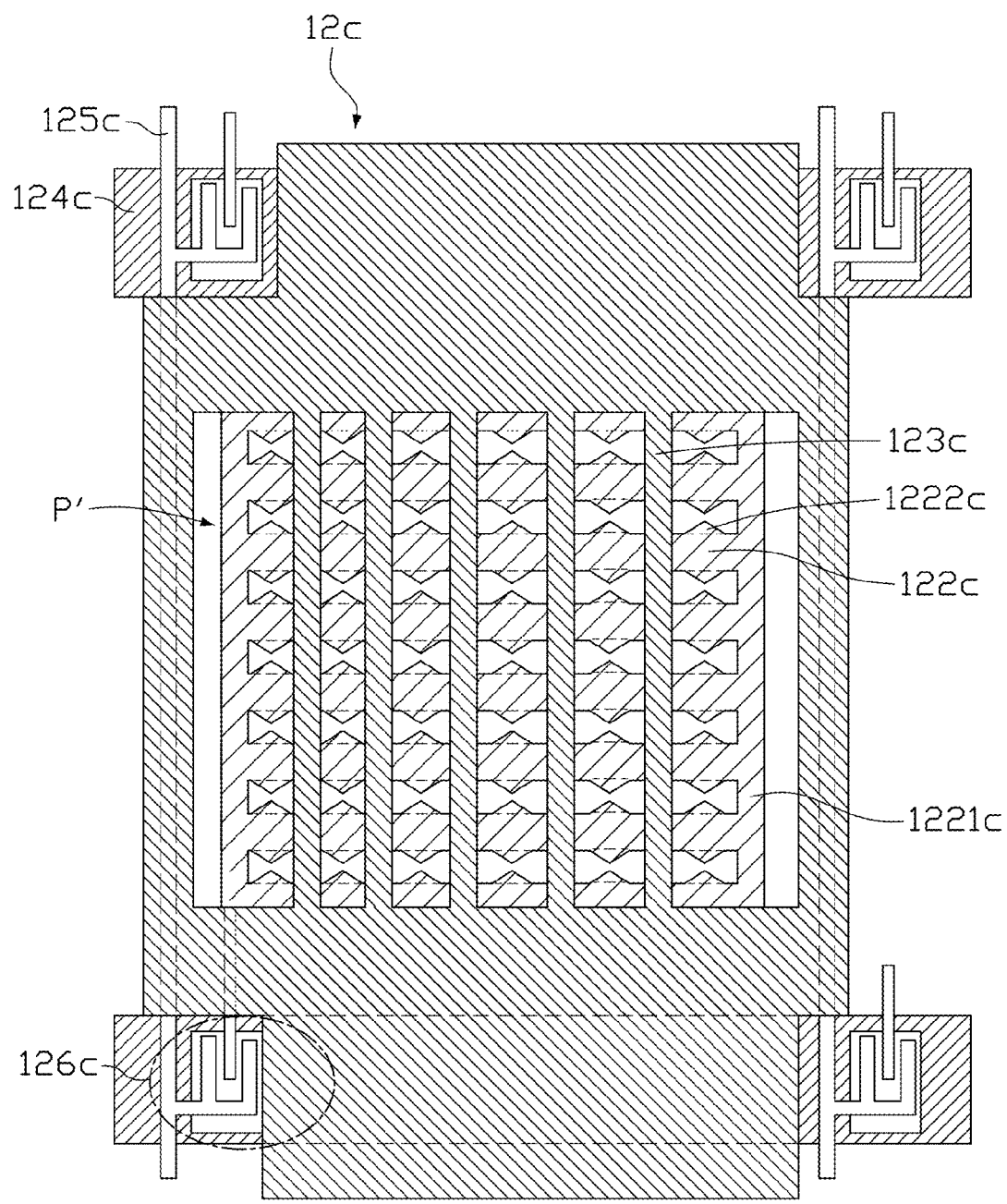
FIG. 14 is a plan view of the second substrate in another exemplary structure of the first embodiment of the present invention.
Figure 15:
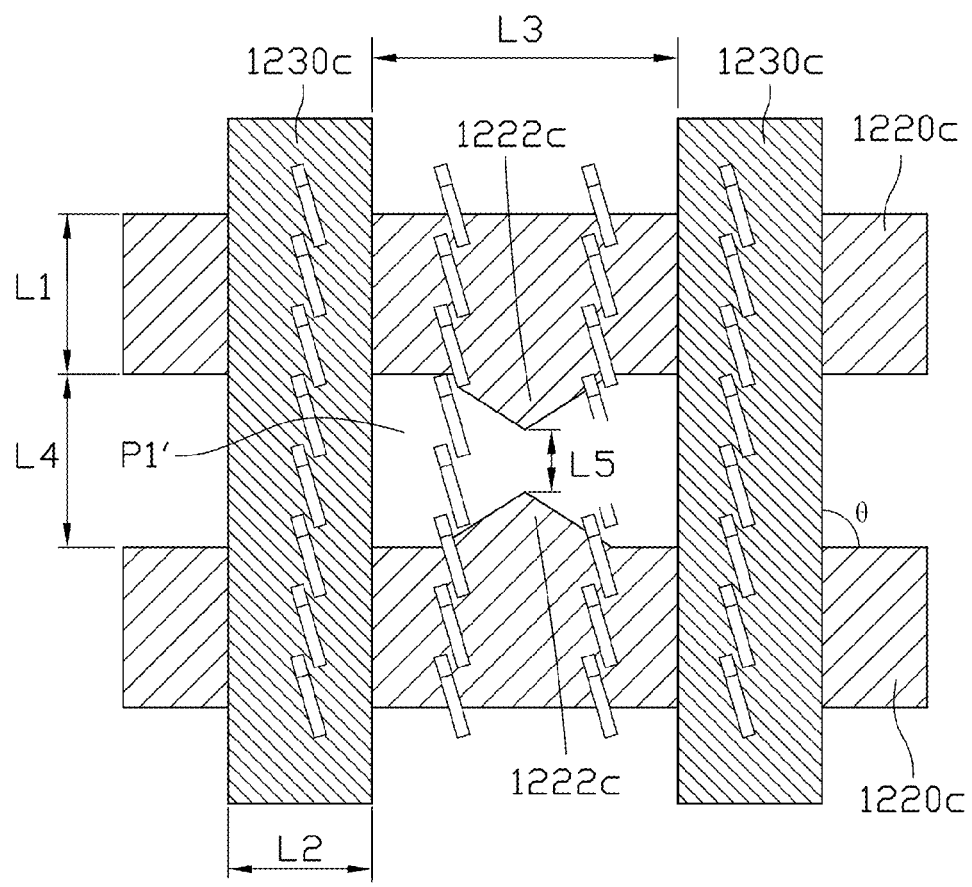
FIG. 15 is a partial enlarged view of part of sub-pixel area in FIG. 14.

Another exemplary structure of the second substrate in the first embodiment can be the structure as shown in FIGS. 14 and 15. For simplicity and clarity of illustration, FIG. 14 only shows one pixel area of the LCD device. FIG. 15 is a partial enlarged view of part of sub-pixel area of FIG. 14.

Referring to FIGS. 14 and 15, in the another exemplary structure, the second substrate 12c in the LCD device includes a second transparent substrate 121c, a plurality of gate lines 124c, a plurality of data lines 125c and a plurality of thin film transistors (TFTs) 126c disposed at intersections of the gate lines 124c and the data lines 125c. The gate lines 124c, the data lines 125c and the TFTs 126c are formed on the second transparent substrate 121c. The gate lines 124c and the data lines 125c are insulated and intersected with each other to define a plurality of pixel areas P'. That is, each two adjacent gate lines 124c and each two adjacent data lines 125c are intersected with each other to define one pixel area P'. A second electrode 122c includes a plurality of second electrode portions 1220c, and a third electrode 123c includes a plurality of third electrode portions 1230c. The plurality of second electrode portions 1220c are electrically coupled to each other by an electrode connection portion 1221c. The electrode connection portion 1221c is substantially parallel to an elongated direction of the third electrode portions 1230c and disposed at the edge of the pixel area P'. The second electrode portions 1220c, the third electrode portions 1230c and the electrode connection portion 1221c are transparent electrodes, and may be formed by transparent conductor materials, such as indium tin oxide (ITO), for example. The second electrode portions 1220c and the third electrode portions 1230c are arranged at different insulation layers respectively and an insulation layer (not shown) is disposed therebetween to electrically insulate the second electrode portions 1220c and the third electrode portions 1230c.

The second electrode portions 1220c and the third electrode portions 1230c are insulated and intersected with each other to define a plurality of sub-pixel areas P1'. Preferably, each pixel area P' includes at least four sub-pixel areas P1' to increase the transmittance of the LCD device.

In each sub-pixel area P1', two protrusion-shaped patterns 1222c facing each other are formed on the second electrode 122c, where the second electrode 122c and the third electrode 123c are not overlapped. The protrusion-shaped patterns 1222c are triangular protrusion-shaped patterns or curve protrusion-shaped patterns, such as semi-circular protrusion-shaped patterns or any other protrusion-shaped patterns with a curved edge. The second electrode portions 1220c each is approximately strip-shaped and substantially parallel to each other, and are electrically coupled to each other. The third electrode portions 1230c each is approximately strip-shaped and substantially parallel to each other, and are electrically coupled to each other. An angle between the second electrode portions 1220c and the third electrode portions 1230c is in a range from about 50 degrees to about 150 degrees, to improve a response speed of the LC molecules. Preferably, the second electrode portions 1220c are substantially parallel to the gate lines 124c. The third electrode portions 1230c are substantially parallel to the data lines 125c.

Preferably, the width L1 of each second electrode portion 1220c and the width L2 of each third electrode portion 1230c respectively has a range from about 2 μm to about 5 μm. In addition, in the sub-pixel area P1', because the second electrode portion 1220c is disposed under the third electrode portion 1230c, the gap width L3 between each two adjacent third electrode portions 1230c is in a range from about 3 μm to about 8 μm, the gap width L4 between each two adjacent second electrode portions 1220c is in a range from 0 μm to about 6 μm, and a gap width L5 between two triangular protrusion-shaped patterns 1222c respectively disposed on each two adjacent second electrode portions 1220c is in a range from 0 to about 6 μm.

It can be understood that, the specific structures of the second electrode and the third electrode in the second substrate of the present invention are not limited to these two exemplary structures as described above.

Preferably, the second electrode (122, 222, or 322) is pixel electrode, the third electrode (123, 223, or 323) is common electrode. The first electrode (114, 214, or 314) may be floated, conducted with the third electrode (123, 223, 323) or grounded after being conducted with the third electrode (123, 223, 323).

The following are descriptions of these three ways illustrated by the LCD device shown in FIG. 2 as an example.

In an exemplary embodiment of the present invention, the first electrode is conducted with the third electrode. Specific, the first electrode 114 and the third electrode 123 can be conducted with each other by the means shown in FIG. 16.

Figure 16:
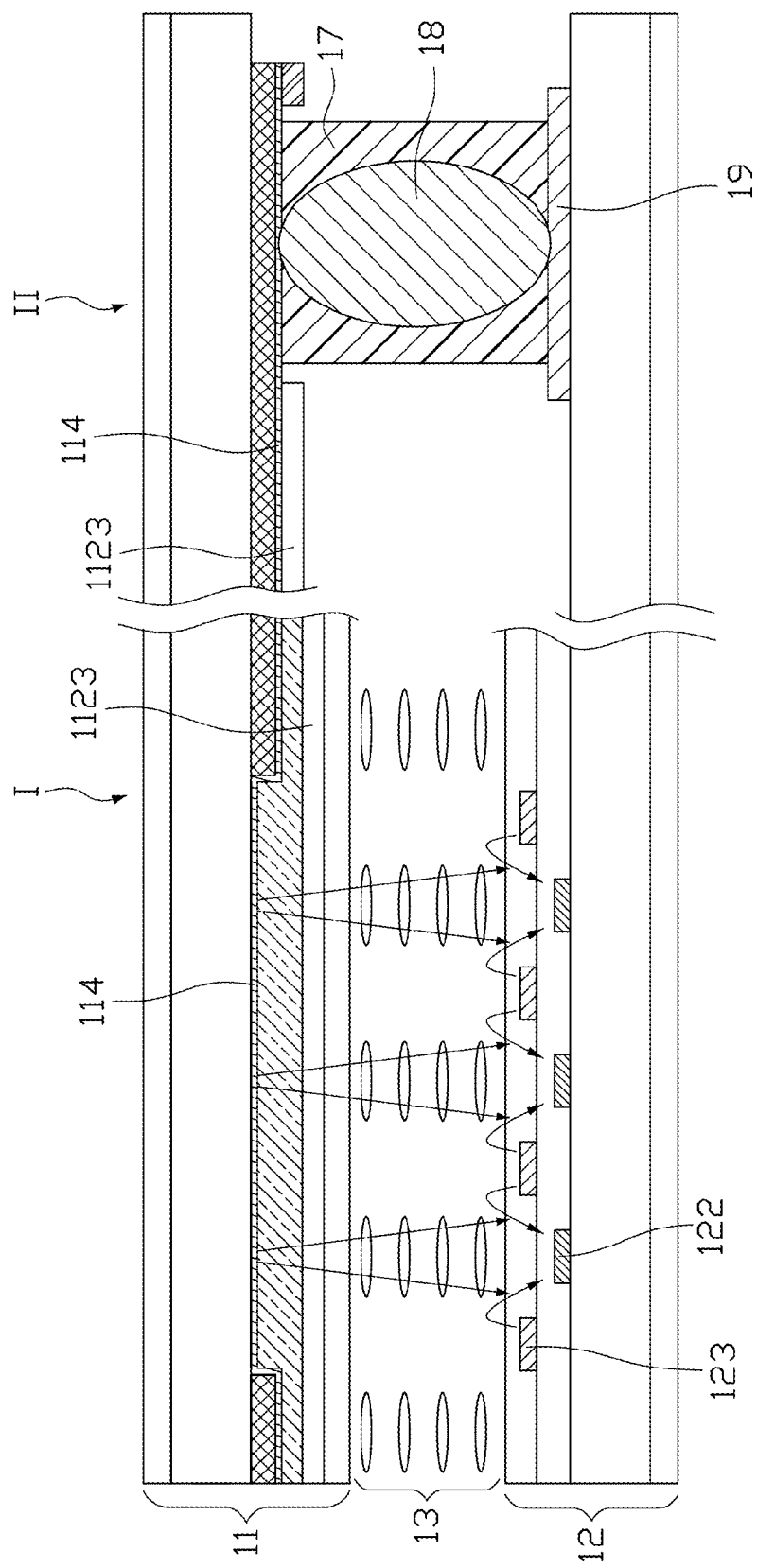
FIG. 16 is a cross-sectional view of the LCD device in FIG. 2 showing an exemplary structure of sealing.

Referring to FIG. 16, an adhesive sealant is placed between the first substrate 11 and the second substrate 12 to seal the first substrate 11 to the second substrate 12. The adhesive sealant 17 may be disposed surrounding the liquid crystal layer 13. That is, the adhesive sealant 17 may be placed in an outside area (labeled as II in FIG. 16) surrounding the plurality of pixel areas P (labeled as I in FIG. 16). Furthermore, the adhesive sealant 17 includes a conductor 18 (Au ball, for example) disposed therein. The conductor 18 has two ends exposed from the adhesive sealant 17, one end of the conductor 18 is conducted with the first electrode 114 in the first substrate 11, and the other end of the conductor 18 is conducted with the third electrode 123 though a metal layer 19. The metal layer 19 is conducted with the third electrode 123. It should to be noted that, in an actual manufacturing process, in order to apply a signal to the first electrode 114 in the first substrate 11, a mask needs to be applied to form a pattern on the over coat layer 1123 to expose the first electrode 114 therefrom to conducted the conductor 18 with the first electrode 114.

In another exemplary embodiment, the metal layer 19 can be grounded, so that the first electrode 114 can be grounded after being conducted with the third electrode 123.

In alternative embodiments, the first electrode (114, 214, or 314) in the first substrate (11, 21, or 31) may be a floating electrode. That is, the first electrode (114, 214, or 314) can be floated, not conducted with the second electrode, the third electrode or GND. When the external ion generating static electricity, because the first electrode (114, 214, or 314) is an electrode layer, set on an entire surface, electrostatic ion can be distributed more evenly, and the electrostatic moire (Mura) phenomenon can be prevented. In addition, a coupling capacitance produced by the second substrate (12, 22, 32) though the LC layer (13, 23, 33) makes the first electrode (114, 214, or 314) in the first substrate (12, 22, 32) with a charge, thus weakening the vertical electric field between the first substrate (11, 21, 31) and the second substrate (12, 22, 32), so that the LCD device has an improved transmittance and a faster response time. In such embodiments, the first electrode may also be called shared electrode.

Figure 17:
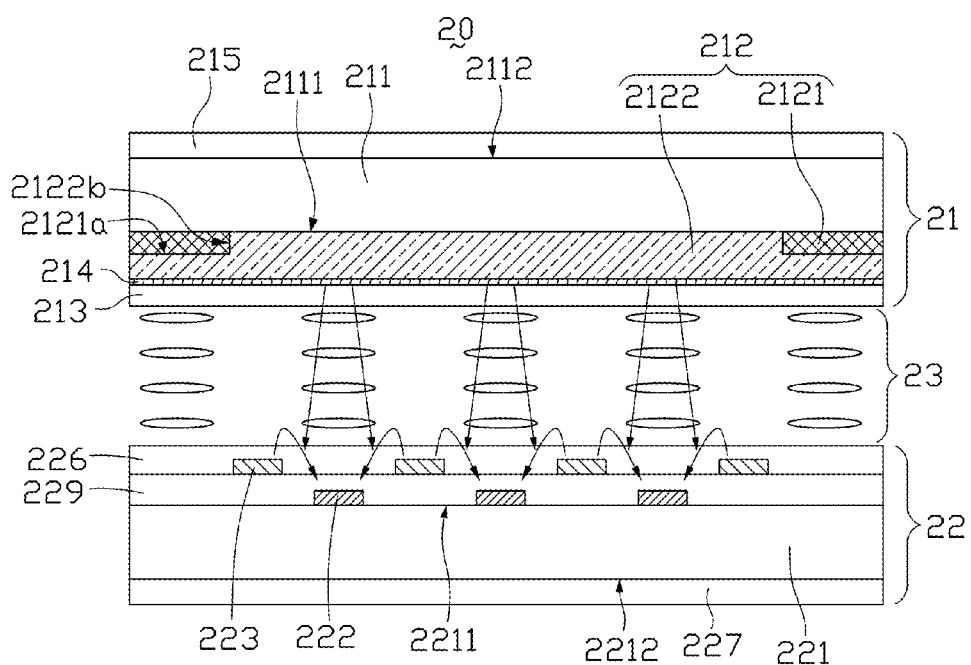
FIG. 17 is a cross-sectional view of the LCD device in FIG. 5 omitting the over coat layer.

FIG. 17 is a cross-sectional view of the LCD device in FIG. 5 while omitting the over coat layer. In comparison with the LCD device in FIG. 5, the LCD device in the FIG. 17 only omits the over coat layer. That is, in FIG. 17, the first alignment film 213 is directly formed on a surface of the first electrode 214 disposed far away from the first transparent substrate 211. The structures of other portions of the LCD device in FIG. 17 is same as described above in FIG. 5, and will not be described in detail here. In an simulation experiment, when the first electrode 214 in FIG. 17 is floated, the transmittance of the LCD device in FIG. 17 is approximately equal to 7.00%, a turn-on response time (Ton) of the LC molecules thereof is approximately equal to 19.6021 ms, a turn-off response time (Toff) of the LC molecules thereof is approximately equal to 28.1107 ms, a overall response time (RT) of the LC molecules thereof is approximately 47.7128 ms, and a center contrast degree thereof is approximately 3449.11. In comparison with the data of the comparing example, it can be seen that, if the first electrode is floated, the LCD device has a faster response time than the LCD device in the comparing example, and the transmittance is also improved. Table 4 shows comparison results of transmittance, open response time (Ton), OFF response time (Toff), overall response time (RT), and center contrast degree (Center CR) between the LCD device in the comparing example, the example 1, the example 3, and the example 4, when the first electrode is conducted with the third electrode and the first electrode is floated respectively.

TABLE 4

| | comparing example | example 1 | | example 3 | | example 4 | |
|---|---|---|---|---|---|---|---|
| | conducted | conducted | floated | conducted | floated | conducted | floated |
| transmittance | 6.67% | 7.00% | 7.00% | 7.00% | 6.98% | 7.01% | 7.00% |
| Ton (ms) | 36.0686 | 20.5008 | 19.7806 | 22.6103 | 19.217 | 22.6184 | 19.6021 |
| Toff (ms) | 26.9227 | 28.0716 | 28.0649 | 27.9664 | 28.3055 | 28.0002 | 28.1107 |
| RT (ms) | 62.9913 | 48.5724 | 47.8455 | 50.5767 | 47.5225 | 50.6186 | 47.7128 |
| Center CR | 3320.85 | 3549.21 | 3595.16 | 3595.16 | 3497 | 3170.25 | 3449.11 |

In the simulation experiment, the overall response time RT of the comparing example is about 62.99 ms, and the overall response time of the example 1, 3, 4 (when the first electrode is floated) is about 47 ms. Therefore, when the first electrode is floated, a response time of the LCD device in the examples 1, 3, and 4 is faster than the response time of the LCD device in the comparing example, and is faster than the LCD device in the same example when the first electrode is conducted with the third electrode. It can be seen that, when the first electrode is floated, the LCD device has a faster response time. In addition, if the first electrode is floated, there is no more of the conductor 18 needing to be disposed inside the adhesive sealant 17 in FIG. 16, so that the width of the adhesive sealant 17 can be narrower, and an effect of narrow border is easier to be achieved.

In summary, in the embodiments of the present invention, a first electrode is interlayered in the color filter layer in the first substrate (color filter substrate), because of that, a distance between the first electrode in the first substrate and the second electrode and the third electrode in the second substrate is increased, thereby weakening a vertical electric field between the first substrate and the second substrate, so that the LCD device has an improved transmittance and faster response time.

The above description is given by way of example, and not limitation. Given the above disclosure, one skilled in the art could devise variations that are within the scope and spirit of the present invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A liquid crystal display device, comprising:
   a first substrate;
   the first substrate comprising:
      a first transparent substrate comprising a first surface disposed adjacent to a second substrate and a second surface disposed away from the second substrate,
      a color filter layer formed on the first surface of the first transparent substrate,
      a first alignment film formed on the color filter layer, and
      a first electrode interlayered in the color filter layer and continuously covering the whole first surface of the first transparent substrate, wherein the first electrode does not penetrate both the color filter layer and the first alignment film;
   the second substrate opposite to the first substrate;
   the second substrate comprising:
      a second transparent substrate comprising a third surface disposed adjacent to the first substrate and a fourth surface disposed away from the first substrate,
      a second electrode and a third electrode formed on the third surface of the second transparent substrate sequentially, wherein the second electrode and the third electrode are non-coplanar and arranged at different insulation layers respectively and electrically insulated from each other, the second electrode comprises a plurality of second electrode portions and the third electrode comprises a plurality of third electrode portions, wherein the first electrode is a floating electrode, the first electrode is connected to ground, or the first electrode is electrically connected with the third electrode, and
      a second alignment film formed on the third electrode; and
   a liquid crystal layer, sandwiched between the first substrate and the second substrate,
   wherein the first alignment film has a first friction direction, the second alignment film has a second friction direction, the first friction direction is opposite to the second friction direction,
   a first angle is defined between an extension direction of the third electrode and the second friction direction, the first angle is in a range from 60 degrees to 84 degrees when liquid crystal molecules in the liquid crystal layer are negative liquid crystal molecules and is in a range from 6 degrees to 30 degrees when the liquid crystal molecules in the liquid crystal layer are positive liquid crystal molecules, and
   two opposite protrusion-shaped patterns facing each other are formed on each of the second electrode portions at non-overlapping areas between the second electrode and the third electrode.

2. The liquid crystal display device as claimed in claim 1, wherein the color filter layer comprises a black matrix layer and a photoresist layer, the black matrix layer is formed on the first surface of the first transparent substrate, the first electrode is formed on the black matrix layer, and the photoresist layer is formed on the first electrode.

3. The liquid crystal display device as claimed in claim 2, wherein the first electrode is directly formed on the black matrix layer and a portion of the first surface of the first transparent substrate not covered by the black matrix layer, and the photoresist layer is directly formed on a surface of the first electrode away from the first transparent substrate.

4. The liquid crystal display device as claimed in claim 3, wherein the first alignment film is directly formed on a surface of the photoresist layer away from the first transparent substrate.

5. The liquid crystal display device as claimed in claim 2, wherein the color filter layer further comprises an over coat layer, the over coat layer is directly formed on a surface of the photoresist layer away from the first transparent substrate, and the first alignment film is disposed between the over coat layer and the liquid crystal layer.

6. The liquid crystal display device as claimed in claim 2, wherein the color filter layer further comprises an over coat layer, the over coat layer is directly formed on the black matrix layer and a portion of the first surface of the first transparent substrate, the portion of the first surface is not covered by the black matrix, the first electrode is directly formed on a surface of the over coat layer away from the first transparent substrate, and the photoresist layer is formed on a surface of the first electrode away from the first transparent substrate.

7. The liquid crystal display device as claimed in claim 1, wherein the color filter layer further comprises a over coat layer, the over coat layer is directly formed on a surface of the first electrode away from the first transparent substrate, the first alignment film is directly formed on a surface of the over coat layer away from the first transparent substrate.

8. The liquid crystal display device as claimed in claim 1, wherein the second electrode is a pixel electrode, and the third electrode is a common electrode.

9. The liquid crystal display device as claimed in claim 8, wherein the first electrode is electrically connected with the third electrode, and the liquid crystal display device further comprises:

an adhesive sealant disposed between the first substrate and the second substrate to seal the first substrate to the second substrate and surrounding the liquid crystal layer, wherein the adhesive sealant comprises a conductor disposed therein, a first end of the conductor is electrically connected with the first electrode and a second end of the conductor is electrically connected with the third electrode.

10. The liquid crystal display device as claimed in claim 1, wherein the first electrode is an electrode layer.

11. The liquid crystal display device as claimed in claim 1, wherein the color filter layer comprises a black matrix layer and a photoresist layer, the black matrix layer is directly formed on the first surface of the first transparent substrate, the photoresist layer is formed on the black matrix layer and a portion of the first surface of the first transparent substrate not covered by the black matrix layer, the first electrode is directly formed on a surface of the photoresist layer away from the first transparent substrate.

12. The liquid crystal display device as claimed in claim 1, wherein a second angle is defined between the second electrode portions and the third electrode portions, and the second angle is in a range from 50 degrees to 150 degrees.

* * * * *